United States Patent
Hasegawa

(10) Patent No.: US 12,105,923 B2
(45) Date of Patent: Oct. 1, 2024

(54) TOUCH SENSOR

(71) Applicant: FUJIFILM Corporation, Tokyo (JP)

(72) Inventor: Kazuhiro Hasegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/505,666

(22) Filed: Nov. 9, 2023

(65) Prior Publication Data

US 2024/0176454 A1    May 30, 2024

(30) Foreign Application Priority Data

Nov. 29, 2022  (JP) .................................. 2022-190158

(51) Int. Cl.
*G06F 3/044*     (2006.01)

(52) U.S. Cl.
CPC .......... *G06F 3/0446* (2019.05); *G06F 3/0443* (2019.05); *G06F 2203/04112* (2013.01)

(58) Field of Classification Search
CPC ................. G06F 3/0446; G06F 3/0443; G06F 2203/04112; G06F 3/041; G06F 3/0445; G06F 2203/04103
See application file for complete search history.

(56) References Cited

U.S. PATENT DOCUMENTS

| | | | | |
|---|---|---|---|---|
| 11,216,123 B2* | 1/2022 | Matsuoka | ................ | G06F 3/044 |
| 2015/0093587 A1* | 4/2015 | Imamura | .............. | H05K 1/0274 |
| | | | | 428/457 |
| 2015/0195908 A1* | 7/2015 | Matsushita | ............ | H05K 1/092 |
| | | | | 174/257 |
| 2018/0046284 A1* | 2/2018 | Higashi | ............... | C23C 18/1605 |
| 2018/0057943 A1* | 3/2018 | Tsukamoto | ............ | H05K 3/181 |
| 2018/0371619 A1* | 12/2018 | Tsukamoto | ............. | B32B 9/005 |
| 2019/0346592 A1* | 11/2019 | Nakazawa | ............... | G02B 1/14 |
| 2019/0369812 A1* | 12/2019 | Narita | ..................... | B32B 15/08 |
| 2020/0326816 A1* | 10/2020 | Ogura | ................... | G06F 3/0446 |
| 2020/0409494 A1* | 12/2020 | Matsuoka | .............. | H05K 3/285 |
| 2020/0409495 A1* | 12/2020 | Ichiki | ..................... | H05K 3/185 |
| 2023/0095219 A1* | 3/2023 | Nukui | ................... | G06F 3/0446 |
| | | | | 345/204 |
| 2023/0123926 A1* | 4/2023 | Hasegawa | ............. | G06F 3/0445 |
| | | | | 345/174 |

FOREIGN PATENT DOCUMENTS

JP     2022-120829 A    8/2022

* cited by examiner

*Primary Examiner* — Grant Sitta
(74) *Attorney, Agent, or Firm* — Edwards Neils LLC; Jean C. Edwards, Esq.

(57) ABSTRACT

A touch sensor satisfies three characteristics of rub resistance, bending properties, and suppression of occurrence of a moire. The touch sensor includes a transparent substrate having a display region and a non-display region and a fine metal wire disposed in the display region. A mesh pattern is composed of fine metal wires, and the fine metal wire includes a layer to be plated and a metal layer formed on the layer to be plated in this order from a transparent substrate side. The layer to be plated is a convex shape and includes an organic component as a main component, the fine metal wire has an average line width of 1 to 2.5 μm, and a ratio of the average line width of the fine metal wires to an average line width of layers to be plated is 1.25 to 1.6.

20 Claims, 7 Drawing Sheets

TOUCH SENSOR

CROSS-REFERENCE TO RELATED APPLICATIONS

The present application claims priority under 35 U.S.C. § 119 to Japanese Patent Application No. 2022-190158, filed on Nov. 29, 2022. The above application is hereby expressly incorporated by reference, in its entirety, into the present application.

BACKGROUND OF THE INVENTION

1. Field of the Invention

The present invention relates to a touch sensor including a fine metal wire.

2. Description of the Related Art

Among various electronic apparatuses including portable information apparatus such as a tablet computer and a smartphone, there is a touch panel which is used in combination with a display device such as a liquid crystal display device and with which an input operation to an electronic apparatus is carried out by bringing a finger, a stylus pen, or the like into touch or a close contact to a screen.

In the touch panel, a conductive film on which a plurality of detection electrodes and the like for detecting a touch operation with a finger, a stylus pen, or the like are formed is usually used as a touch sensor. The detection electrode of the conductive film is formed from a transparent conductive oxide such as indium tin oxide (ITO), a metal, or the like. The metal has advantages such as easier patterning, more excellent bending properties, and a lower electric resistance value, as compared with the transparent conductive oxide. Therefore, in the conductive film that is used as the touch sensor, a metal such as copper or silver is used in a fine metal wire that constitutes a detection electrode, a lead out wire, and the like.

For example, JP2022-120829A describes a conductive film including a conductive layer having a net-like conductive pattern consisting of a linear part on a surface of a base consisting of an inorganic material, a glass material, or a polymer material. In the conductive film of JP2022-120829A, the linear part constituting the net-like conductive pattern includes an underlying layer and a plating layer, the plating layer is a layer having a metal with a conductivity of 10 to 200 mS/mm² or an alloy thereof as a main material, the underlying layer is a layer having a metal having a higher ionization tendency than that of the metal which is the main material of the plating layer, or an alloy thereof as a main material, and the line width of the linear part of the conductive layer is 0.5 to 20.0 μm.

SUMMARY OF THE INVENTION

A conductive film used as a touch sensor is required to have rub resistance against a touch operation with a finger, a stylus pen, or the like. In addition, the conductive film may be bent, and it is thus required that the electric resistance of a fine metal wire does not increase due to a damage of the fine metal wire during bending. That is, the fine metal wire is required to have bending properties. Furthermore, since the conductive film is disposed on, for example, a liquid crystal display panel, it is also required that a moire does not occur.

However, the conductive film of JP2022-120829A cannot satisfy the above-described three characteristics of rub resistance, bending properties, and suppression of occurrence of a moire.

An object of the present invention is to provide a touch sensor that satisfies three characteristics of rub resistance, bending properties, and suppression of occurrence of a moire. The above-described object can be achieved by the following configurations.

An invention [1] relates to a touch sensor including a transparent substrate having a display region and a non-display region, and a fine metal wire disposed in the display region, in which a mesh pattern is composed of fine metal wires, the fine metal wire includes a layer to be plated and a metal layer formed on the layer to be plated in this order from a transparent substrate side, the layer to be plated includes an organic component as a main component, the fine metal wire has an average line width of 1 to 2.5 μm, a ratio of the average line width of the fine metal wires to an average line width of layers to be plated is 1.25 to 1.6, the layer to be plated has a convex shape in a direction away from the transparent substrate in a cross sectional shape of a cross section of the fine metal wire in a direction orthogonal to one direction in which the fine metal wire extends, and a line width of the layer to be plated on a side closest to the transparent substrate is more than a line width of the layer to be plated at a position of 9/10 of an average height of the layers to be plated facing the direction away from the transparent substrate side in the cross sectional shape.

An invention [2] is the touch sensor according to the invention [1], in which a ratio of the average line width of the fine metal wires to the average height of the layers to be plated is 2 to 10.

An invention [3] relates to the touch sensor according to the invention [1] or [2], in which the average line width of the fine metal wires is 1.5 to 2.0 μm.

An invention [4] relates to the touch sensor according to any one of the inventions [1] to [3], in which the ratio of the average line width of the fine metal wires to the average line width of the layers to be plated is 1.25 to 1.45.

An invention [5] relates to the touch sensor according to any one of the inventions [1] to [4], in which the fine metal wire has a concave part in a central part of a surface of the fine metal wire on a side opposite to the transparent substrate side in the cross sectional shape.

An invention [6] relates to the touch sensor according to any one of the inventions [1] to [5], the fine metal wire is provided with a blackened layer on a surface of the metal layer on an opposite side of the layer to be plated.

An invention [7] relates to the touch sensor according to any one of the inventions [1] to [6], in which an undercoat layer is provided between the transparent substrate and the layer to be plated.

An invention [8] relates to the touch sensor according to any one of the inventions [1] to [7], in which a protective layer is provided on the fine metal wire.

According to the present invention, it is possible to provide a touch sensor that satisfies three characteristics of rub resistance, bending properties, and suppression of occurrence of a moire.

DESCRIPTION OF THE PREFERRED EMBODIMENTS

Hereinafter, a touch sensor of the embodiment of the present invention will be described in detail based on preferred embodiments shown in the accompanying drawings.

Furthermore, it should be noted that the drawings described below are only exemplary for illustrating the present invention, and the present invention is not limited to the drawings shown below.

Moreover, in the following, "to" indicating a numerical range includes numerical values described on both sides thereof. For example, in a case where ε is described to be in a range of a numerical value $\varepsilon_\alpha$ to a numerical value ER, it is intended to mean that ε is in a range including the numerical value $\varepsilon_\alpha$ and the numerical value $\varepsilon_\beta$, which is denoted as $\varepsilon_\alpha \leq \varepsilon \leq \varepsilon_\beta$ using mathematical symbols.

Angles described as, for example, "an angle represented by a specific numerical value", "parallel", "perpendicular", and "orthogonal" include error ranges generally tolerated in the art unless otherwise described.

Furthermore, the "transparency" is intended to mean that the light transmittance is 40% or more in a visible light wavelength range of a wavelength range of 380 to 780 nm unless otherwise specified, and the light transmittance is preferably 80% or more, and more preferably 90% or more. In addition, in the following description, an expression of being transparent represents being transparent with respect to visible light unless otherwise specified.

The light transmittance is measured using "Plastics—Determination of total light transmittance and reflectance" specified in Japanese Industrial Standards (JIS) K 7375: 2008.

Image Display Apparatus

Figure 1:
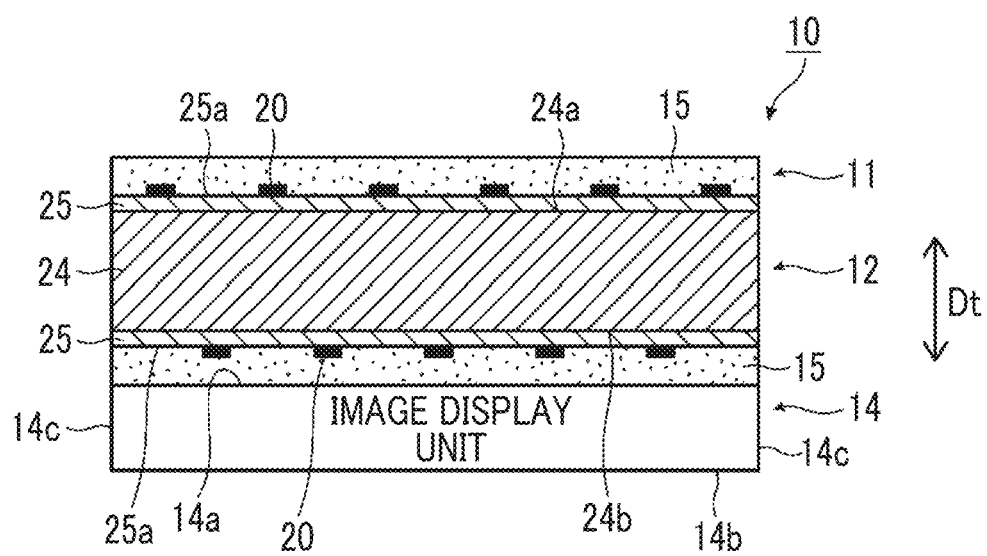
FIG. 1 is a schematic cross sectional view showing one example of an image display apparatus having a touch sensor of an embodiment of the present invention.

FIG. 1 is a schematic cross sectional view showing one example of an image display apparatus of the embodiment of the present invention.

An image display apparatus 10 has a touch sensor 12, an image display unit 14, and a protective layer 15. In the image display apparatus 10, the image display unit 14, the protective layer 15, the touch sensor 12, and the protective layer 15 are laminated in this order in a lamination direction Dt. The protective layer 15 is disposed between the touch sensor 12 and the image display unit 14. In addition, the protective layer 15 is disposed on the touch sensor 12 of the image display apparatus 10 on the side opposite to the image display unit 14.

In the image display apparatus 10, it is preferable that the protective layer 15 disposed on the display surface 14a side of the image display unit 14, the touch sensor 12, and the protective layer 15 are all transparent so that a display object (not shown) displayed on the display surface 14a of the image display unit 14 can be visible.

The surface of the protective layer 15 disposed on the side opposite to the image display unit 14 is a touch surface of the image display apparatus 10, and serves as an operation surface.

A controller (not shown) is provided on a back surface 14b of the image display unit 14. The touch sensor 12 is bent to surround a side surface 14c of the image display unit 14, whereby a first external connection terminal 26a (see FIG. 2) and a second external connection terminal 26b (see FIG. 2) are disposed on the back surface 14b side of the image display unit 14. The first external connection terminal 26a and the second external connection terminal 26b of the touch sensor 12 and the controller (not shown) are electrically connected by, for example, a wiring member having flexibility such as a flexible circuit board 19 (see FIG. 2). For example, a touch panel 11 is composed of the touch sensor 12 and a controller.

The controller is composed of a known controller that is used for the detection in a touch sensor. In a case where the image display apparatus 10 belongs to a capacitance type, the controller detects a position where the capacitance is changed by a touch with a finger or the like on a touch surface. Examples of the capacitance type touch panel include, but are not particularly limited to, a mutual capacitance type touch panel and a self-capacitance type touch panel.

The protective layer 15 is not particularly limited in its configuration as long as it is transparent, has electrical insulating properties, and can stably fix the touch sensor 12 and the image display unit 14. As the protective layer 15, for example, an optical clear resin (OCR) such as an optical clear adhesive (OCA) and an ultra violet (UV) curing resin can be used.

The image display unit 14 is an image display unit including the display surface 14a for displaying a display object such as an image, and is, for example, a liquid crystal display device. The image display unit 14 is not limited to the liquid crystal display device and may be an organic electro luminescence (organic EL) display device. In addition to those described above, a cathode ray tube (CRT) display device, a vacuum fluorescent display (VFD), a plasma display panel (PDP), a surface electric field display (SED), an electric field emission display (FED), an electron paper, or the like can be used for the image display unit 14.

An image display unit in response to the use application of the image display unit 14 can be appropriately used, but the image display unit 14 preferably has a form of a panel such as a liquid crystal display panel or an organic EL panel so that the thickness of the image display apparatus 10 is configured to be thin.

Moreover, in the image display apparatus 10, a cover layer (not shown) may be further provided on a surface of the protective layer 15 on the opposite side of the image display unit 14. In this case, the surface of the cover layer is a touch surface of the image display apparatus 10 and serves as an operation surface. In this case, the surface of the cover layer is subjected to an input operation as an operation surface. Furthermore, the touch surface is a surface that detects a touch with a finger, a stylus pen, or the like. The surface of the cover layer serves as a visible surface of a display object (not shown) displayed on the display surface 14a of the image display unit 14. Furthermore, in a case where the cover layer is composed of glass, it is referred to as a cover glass.

The cover layer protects the touch sensor 12. The configuration of the cover layer is not particularly limited. The cover layer is preferably transparent so that a display object (not shown) displayed on the display surface 14a of the image display unit 14 can be visible. For the cover layer, for example, a plastic film, a plastic plate, a glass plate, or the like is used. It is preferable that the thickness of the cover layer is selected as appropriate according to each use application.

As raw materials of the above-described plastic film and plastic plate, for example, polyesters such as polyethylene terephthalate (PET) and polyethylene naphthalate (PEN); polyolefins such as polyethylene (PE), polypropylene (PP), polystyrene, and vinyl acetate copolymerized polyethylene (EVA); vinyl resins; and other materials such as a polycarbonate (PC), polyamide, polyimide, an acrylic resin, triacetyl cellulose (TAC), a cycloolefin-based resin (COP), polyvinylidene fluoride (PVDF), polyarylate (PAR), polyether sulfone (PES), a polymer acrylic resin, a fluorene derivative, crystalline COP, or the like can be used.

In addition, as the cover layer, a polarizing plate, a circularly polarizing plate, or the like may be used.

Since the surface of the cover layer serves as a touch surface as described above, a hard coat layer may be provided on the surface as necessary. The thickness of the cover layer is, for example, 0.1 to 1.3 mm, and is particularly preferably 0.1 to 0.7 mm.

Touch Sensor

Figure 2:
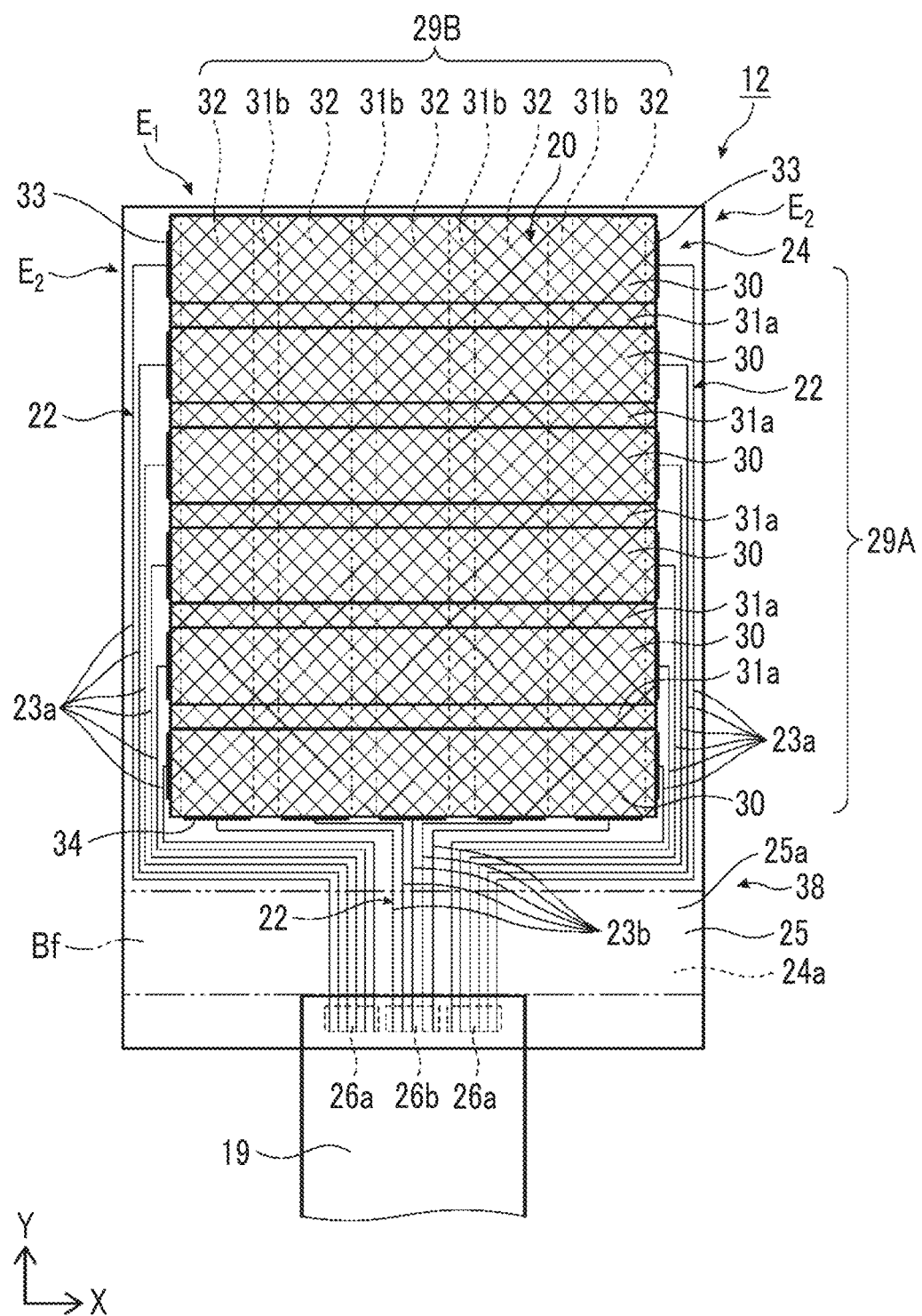
FIG. 2 is a schematic view showing one example of the touch sensor of the embodiment of the present invention.
Figure 3:
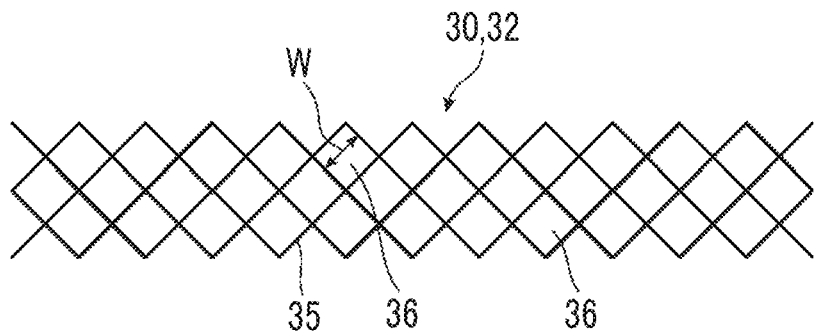
FIG. 3 is a schematic view showing one example of an electrode configuration of a detection unit of the touch sensor of the embodiment of the present invention.
Figure 4:
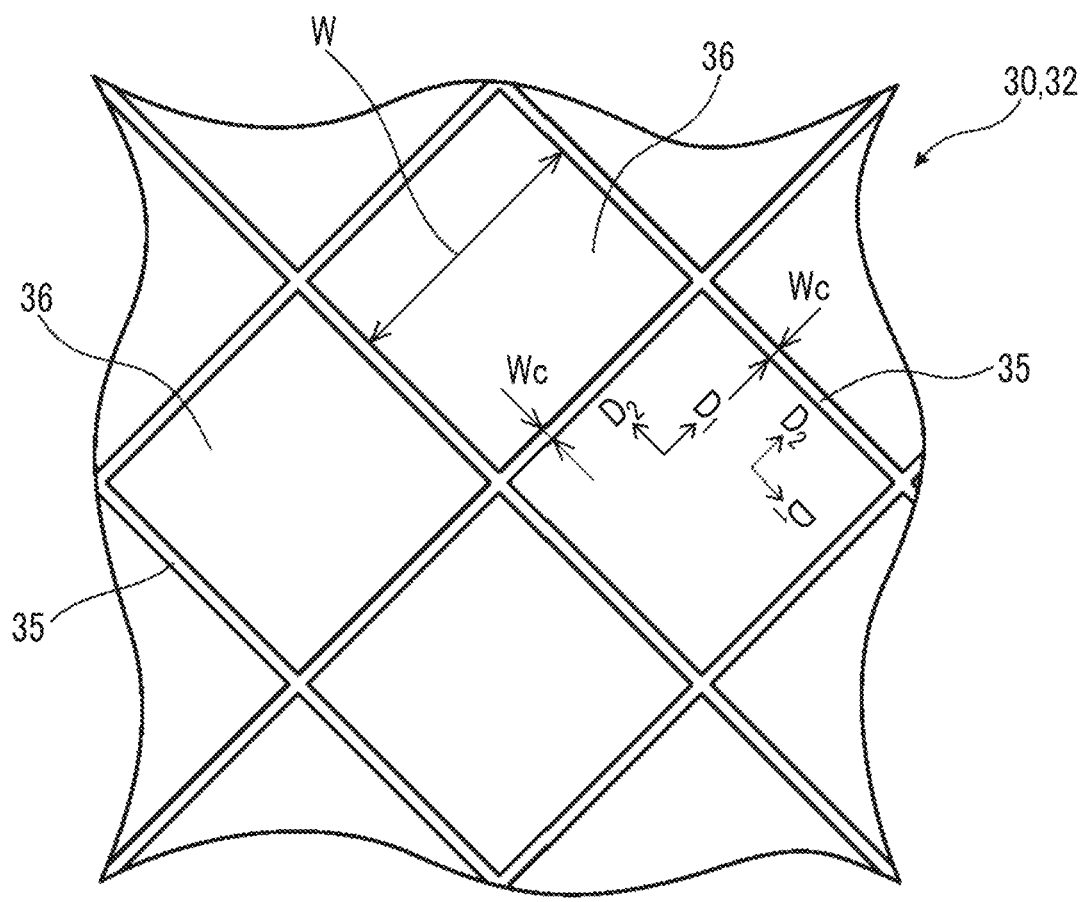
FIG. 4 is a schematic view showing one example of a shape of a mesh pattern of the touch sensor of the embodiment of the present invention.

The touch sensor 12 will be described with reference to FIG. 2. FIG. 2 is a schematic view showing one example of the touch sensor of the embodiment of the present invention. FIG. 3 is a schematic view showing one example of an electrode configuration of a detection unit of the touch sensor of the embodiment of the present invention. FIG. 4 is a schematic view showing one example of a shape of a mesh pattern of the touch sensor of the embodiment of the present invention. Furthermore, in FIGS. 2 to 4, the same reference numerals are assigned to the same configuration components as those in the image display apparatus 10 shown in FIG. 1, and detailed description thereof will not be repeated.

The touch sensor 12 shown in FIG. 2 is a portion functioning as a detection sensor of a touch panel 11 shown in FIG. 1, and has a detection unit 20 that is a detection region $E_1$ where a user can carry out an input operation, and a peripheral wiring part 22 in a peripheral region $E_2$ that is located on the outside of the detection region $E_1$.

The detection region $E_1$ is disposed in the display region of the transparent substrate 24, and the peripheral region $E_2$ located outside the detection region $E_1$ is disposed in the non-display region of the transparent substrate 24. The display region of the transparent substrate 24 is disposed corresponding to the display surface 14a of the image display unit 14. Accordingly, a display object (not shown) displayed on the display surface 14a of the image display unit 14 is visible in the display region of the transparent substrate 24.

The detection unit 20 has, for example, a first detection electrode layer 29A and a second detection electrode layer 29B. The first detection electrode layer 29A and the second detection electrode layer 29B are disposed with the transparent substrate 24 being sandwiched therebetween. The first detection electrode layer 29A and the second detection electrode layer 29B are electrically insulated by the transparent substrate 24. The transparent substrate 24 functions as an electrical insulating layer.

The first detection electrode layer 29A has a plurality of first detection electrodes 30 and a plurality of first dummy electrodes 31a that are disposed between the adjacent first detection electrodes 30 and insulated from the first detection electrodes 30.

In the touch sensor 12, an undercoat layer 25 is provided on each of the entire surface of the surface 24a (see FIG. 1) and the entire surface of the back surface 24b (see FIG. 1) of the transparent substrate 24.

The plurality of first detection electrodes 30 are strip-shaped electrodes that extend in the X direction in parallel with each other and are provided on the surface 25a of the undercoat layer 25 (see FIG. 1) in a state of being spaced apart from each other in the Y direction orthogonal to the X direction and being electrically insulated from each other in the Y direction.

In addition, the plurality of the first dummy electrodes 31a are disposed between the first detection electrodes 30 and are provided on the surface 25a of the undercoat layer 25 (see FIG. 1) in a state of being electrically insulated from the first detection electrodes 30. A first electrode terminal 33 is provided at least one end of each of the first detection electrodes 30 in the X direction.

Furthermore, in a case where the undercoat layer 25 is not provided, a plurality of the first detection electrodes 30 and a plurality of the first dummy electrodes 31a are provided on the surface 24a of the transparent substrate 24 as described above.

The second detection electrode layer 29B has a plurality of second detection electrodes 32 and a plurality of second dummy electrodes 31b that are disposed between the adjacent second detection electrodes 32 and insulated from the second detection electrodes 32. The plurality of the second detection electrodes 32 are strip-shaped electrodes that extend in the Y direction in parallel with each other and are provided on the surface 25a of the undercoat layer 25 (see FIG. 1) in a state of being spaced apart from each other in the X direction and being electrically insulated from each other in the X direction.

In addition, the plurality of second dummy electrodes 31b are disposed between the second detection electrodes 32 and are provided on the surface 25a of the undercoat layer 25 (see FIG. 1) in a state of being electrically insulated from the second detection electrodes 32. A second electrode terminal 34 is provided at one end of each of the second detection electrodes 32 in the Y direction.

Furthermore, in a case where the undercoat layer 25 is not provided, a plurality of the second detection electrodes 32 and a plurality of the second dummy electrodes 31b are provided on the back surface 24b of the transparent substrate 24 as described above.

The plurality of first detection electrodes 30 and the plurality of second detection electrodes 32 are provided orthogonally to each other, but they are electrically insulated from each other by the transparent substrate 24 as described above.

The first dummy electrode 31a and the second dummy electrode 31b in the first detection electrode 30 and the second detection electrode 32 are separated from the first detection electrode 30 or the second detection electrode 32 by a disconnection portion, and they are regions which are not electrically connected. As a result, as described above, the plurality of the first detection electrodes 30 are in a state of being electrically insulated from each other in the Y direction, and the plurality of the second detection electrodes 32 are in a state of being electrically insulated from each other in the X direction. As shown in FIG. 2, six first detection electrodes 30 and five second detection electrodes 32 are provided in the detection unit 20, but the numbers thereof are not particularly limited as long as they are plural.

The first detection electrode layer 29A and the second detection electrode layer 29B are composed of fine metal wires 35. A mesh pattern (see FIGS. 3 and 4) is composed of the fine metal wires 35. The protective layer 15 shown in FIG. 1 is provided on the fine metal wires 35.

The first detection electrodes 30 and the second detection electrodes 32 are each a metal mesh having a mesh pattern formed by the fine metal wires 35. In this case, the first dummy electrode 31a and the second dummy electrode 31b are also each a metal mesh having a mesh pattern formed by the fine metal wires 35.

The electrode width of the first detection electrode 30 and the electrode width of the second detection electrode 32 are each, for example, 1 to 5 mm, and the pitch between the electrodes is 3 to 6 mm. The electrode width of the first detection electrode 30 is denoted as the maximum length in the Y direction and the electrode width of the second detection electrode 32 is denoted as the maximum length in the X direction.

The peripheral wiring part 22 is a region where peripheral wires (a first peripheral wire 23a and a second peripheral wire 23b) that are wires for transmitting or transferring a touch drive signal and a touch detection signal from a controller (not shown) to the first detection electrode 30 and the second detection electrode 32 are disposed. The peripheral wiring part 22 has a plurality of first peripheral wires 23a and a plurality of second peripheral wires 23b. One end of the first peripheral wire 23a is electrically connected to the first detection electrode 30 through the first electrode terminal 33, and the other end thereof is electrically connected to a first external connection terminal 26a. In addition, one end of the second peripheral wire 23b is electrically connected to the second detection electrode 32 through the second electrode terminal 34, and the other end thereof is electrically connected to a second external connection terminal 26b.

The flexible circuit board 19 is electrically connected to the first external connection terminal 26a and the second external connection terminal 26b of the touch sensor 12. The touch sensor film 38 is composed of the touch sensor 12 and a flexible circuit board 19.

The first peripheral wire 23a and the second peripheral wire 23b can also have the same configuration as the first detection electrode 30 and the second detection electrode 32 and are composed of the fine metal wires 35.

The first electrode terminal 33 and the second electrode terminal 34 may have a fill-in film shape or a mesh shape as shown in JP2013-127658A. The preferred range of the widths of the first electrode terminal 33 and the second electrode terminal 34 is ⅓ times or more and 1.2 times or less with respect to each of the electrode widths of the first detection electrode 30 and the second detection electrode 32.

The first detection electrode 30, the first dummy electrode 31a, the first electrode terminal 33, and the first peripheral wire 23a of the first detection electrode layer 29A are preferably integrally constituted, and still more preferably formed of the same metal material from the viewpoints of the electric resistance and the difficulty in the occurrence of disconnection.

Similarly, the second detection electrode 32, the second dummy electrode 31b, the second electrode terminal 34, and the second peripheral wire 23b of the second detection electrode layer 29B are preferably integrally constituted, and still more preferably formed of the same metal material from the viewpoints of the electric resistance and the difficulty in the occurrence of disconnection.

In addition, the first detection electrode 30 and the first dummy electrode 31a of the first detection electrode layer 29A are composed of, for example, the fine metal wires 35 in a mesh pattern (see FIGS. 3 and 4).

The second detection electrode 32 and the second dummy electrode 31b of the second detection electrode layer 29B are composed of, for example, the fine metal wires 35 in a mesh pattern (see FIGS. 3 and 4).

The touch sensor 12 can be bent, for example, in a bending region Bf of the peripheral wiring part 22 shown in FIG. 2, having the surface 24a of the transparent substrate 24 being on the outside.

Fine Metal Wire

Figure 5:
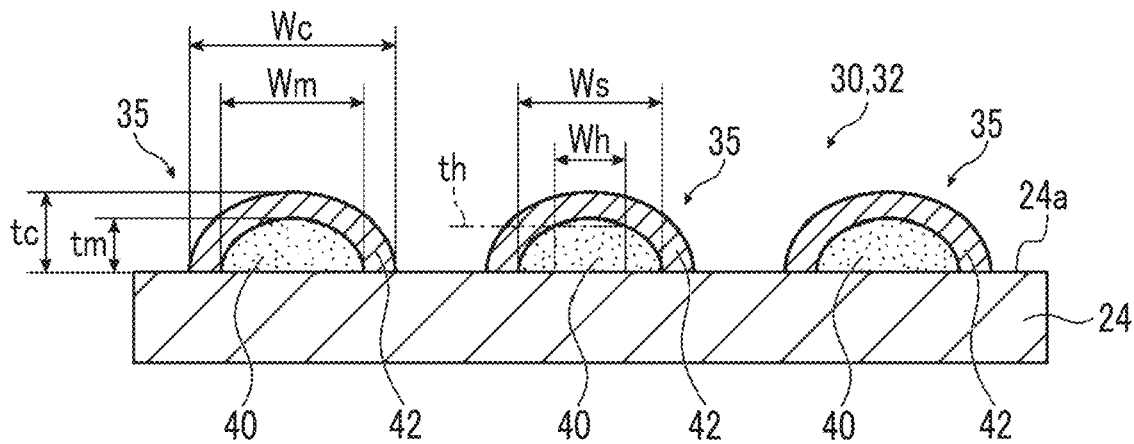
FIG. 5 is a schematic cross sectional view showing a first example of a fine metal wire of the touch sensor of the one embodiment of the present invention.
Figure 6:
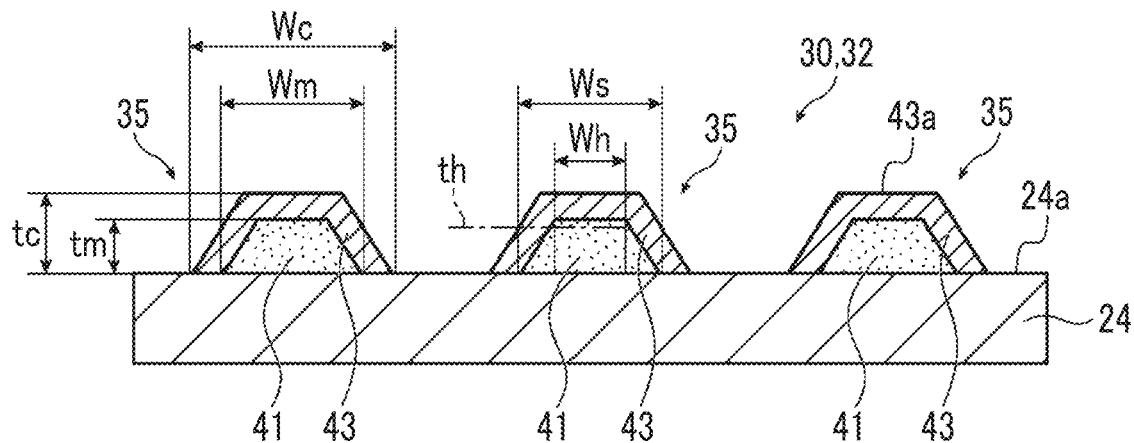
FIG. 6 is a schematic cross sectional view showing a second example of the fine metal wire of the touch sensor according to the embodiment of the present invention.
Figure 7:
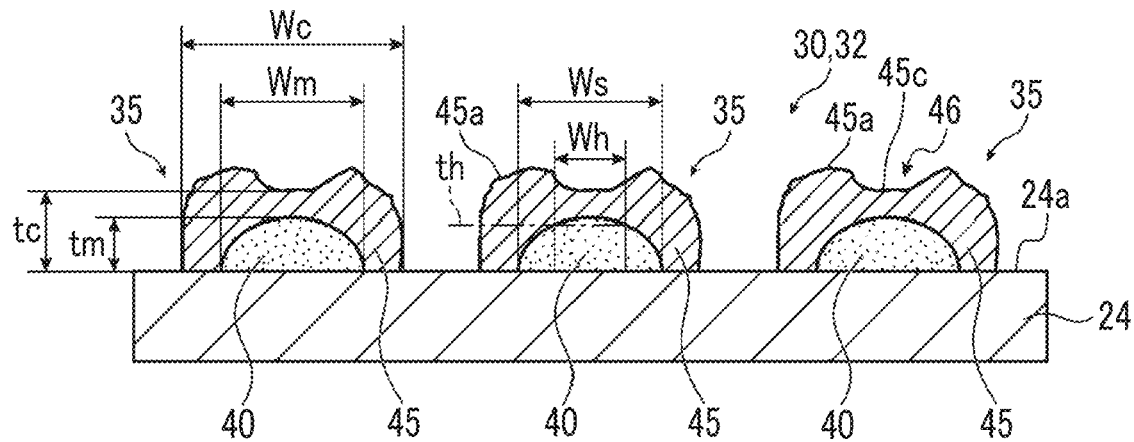
FIG. 7 is a schematic cross sectional view showing a third example of the fine metal wire of the touch sensor according to the embodiment of the present invention.
Figure 8:
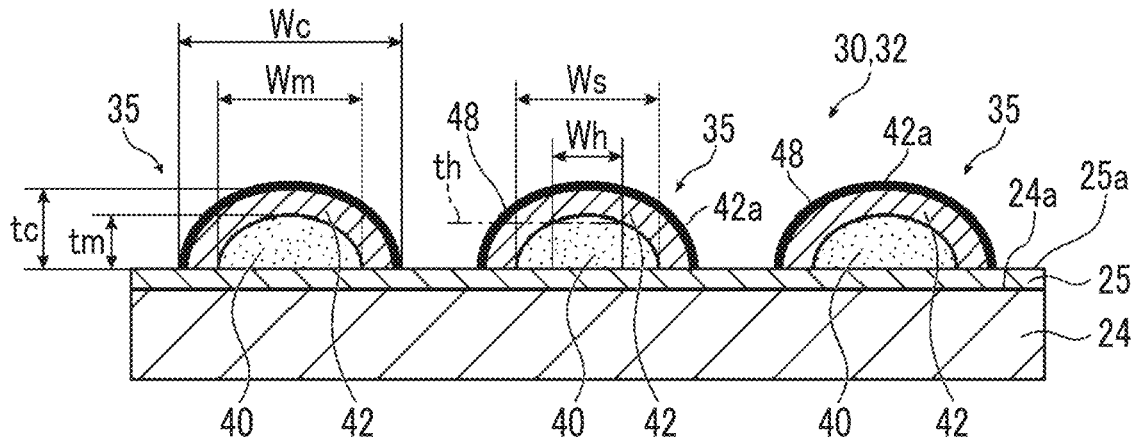
FIG. 8 is a schematic cross sectional view showing a fourth example of the fine metal wire of the touch sensor of the embodiment of the present invention.

FIG. 5 is a schematic cross sectional view showing a first example of a fine metal wire of the touch sensor of the embodiment of the present invention. FIG. 6 is a schematic cross sectional view showing a second example of the fine metal wire of the touch sensor of the embodiment of the present invention. FIG. 7 is a schematic cross sectional view showing a third example of the fine metal wire of the touch sensor of the embodiment of the present invention. FIG. 8 is a schematic cross sectional view showing a fourth example of the fine metal wire of the touch sensor of the embodiment of the present invention.

Furthermore, in FIGS. 5 to 8, the same reference numerals are assigned to the same configuration components as those shown in FIGS. 1 to 4, and detailed description thereof will not be repeated.

As shown in FIG. 4, a mesh pattern is composed of linear fine metal wires 35 extending in the one direction $D_1$ (see FIG. 4).

FIGS. 5 to 7 show a configuration where the above-described undercoat layer 25 is not provided, in which the fine metal wires 35 are disposed on the surface 24a of the transparent substrate 24.

FIGS. 5 to 8 each show a cross sectional shape of a cross section of the fine metal wire 35 in a direction $D_2$ (see FIG. 4) orthogonal to one direction $D_1$ (see FIG. 4). The one direction $D_1$ is an extending direction of the fine metal wire 35.

As shown in FIG. 5, the fine metal wire 35 includes a layer 40 to be plated and a metal layer 42 formed on the layer 40 to be plated. The metal layer 42 is formed by a plating method.

Here, the fine metal wire 35 shown in FIGS. 5 to 8 has a form in which the metal layer 42 constitutes the outer shape of the fine metal wire 35. An average line width Wc of the fine metal wires 35 which will be described later corresponds to an average line width of the metal layers 42, and an average height tc of the fine metal wires 35 corresponds to an average height of the metal layers 42.

The fine metal wire 35 has an average line width Wc of 1 to 2.5 µm, and preferably 1.5 to 2.0 µm. In a case where the average line width Wc is 1 to 2.5 µm, the occurrence of a moire is suppressed.

In a case where the average line width Wc is less than 1 µm, the fine metal wire 35 is fine, and in a case where the fine metal wire 35 is rubbed, scraping, chipping, and cracking of the fine metal wire 35 occur, and the rub resistance is poor. On the other hand, in a case where the average line width Wc is more than 2.5 µm, the fine metal wire 35 is thick and a moire occurs.

Furthermore, the average line width Wc of the fine metal wires 35 is an average length of the fine metal wires 35 in a direction parallel to the surface 24a of the transparent substrate 24, and is the same as the average line width of the metal layers 42.

The ratio of the average line width Wc of the fine metal wires 35 to the average line width Wm of the layers 40 to be plated in the layer 40 to be plated is 1.25 to 1.6, and preferably 1.25 to 1.45. That is, 1.25≤Wc/Wm≤1.6 is satisfied, and it is preferable that 1.25≤Wc/Wm≤1.45 is satisfied.

In a case where the ratio is 1.25 to 1.6, the metal layer is not likely to wear and the adhesiveness between the layer to be plated and the metal layer is improved even in a case where the fine metal wire 35 is rubbed. As a result, failures such as chipping of the metal layer are suppressed, and thus, the ratio is preferable.

In addition, in a case where the above-described ratio is 1.25 to 1.6, it is found that the scraping, the chipping, and the cracking of the fine metal wire 35 can be improved even in a region where the average line width Wc of the fine metal wires 35 is 1.0 to 2.5 µm. The reason for this is presumed to be as follows. Due to the convex shape of the layer to be plated, the contact area between the transport roller and the metal layer decreases during transport, the shape is a shape in which a force acting in a rubbing stress direction can be relieved, and a bending stress can be relieved, whereby the rub resistance and the bending properties are improved.

Furthermore, in a case where the above-described ratio is 1.25 to 1.45, the three characteristics of rub resistance, bending properties, and suppression of occurrence of a moire are excellent, and thus, the ratio is preferable.

In the cross sectional shape of a cross section in a direction $D_2$ orthogonal to the one direction $D_1$ in which the fine metal wire 35 extends, the layer 40 to be plated has a convex shape in a direction away from the transparent substrate 24. In a case where the layer 40 to be plated has a convex shape, an area of a portion that comes into touch during the rubbing of the fine metal wire 35 decreases and the rub resistance is excellent.

In addition, since the layer 40 to be plated includes an organic component as a main component, in a case where the fine metal wire 35 is bent, the bending stress is relieved, as compared to a fine metal wire which is entirely a metal. Therefore, the layer 40 to be plated is easily bent and has excellent bending properties.

The outer shape of the layer 40 to be plated shown in FIG. 5 is an arc shape in a cross section in the above-described direction $D_2$. It is considered that in a case where the outer shape of the layer 40 to be plated is an arc shape, the bending stress is relieved, and the rub resistance and the bending property are improved.

The metal layer 42 formed on the arc-shaped layer 40 to be plated has an arc-shaped outer shape.

Thus, by forming the layer 40 to be plated in a convex shape, the rub resistance and the bending properties of the fine metal wire 35 are excellent.

In the cross sectional shape, the line width Ws of the layer 40 to be plated on the side closest to the transparent substrate 24 is more than the line width Wh of the layer 40 to be plated at a position th of 9/10 of an average height of the layers 40 to be plated in a direction away from the transparent substrate 24 side. The line width Wh of the layer 40 to be plated is also referred to as an apex surface width.

It is preferable that a ratio of the line width Ws to the above-described line width Wh is 2 or more. That is, it is preferable that Ws/Wh≥2 is satisfied. In the cross sectional shape, the bending properties are excellent by making the inclined part of the convex shape of the layer 40 to be plated continuous and gentle.

In the layer 40 to be plated, the ratio of the average line width Wc of the fine metal wires 35 to an average height tm of the layers 40 to be plated is preferably 2 to 10. That is, it is preferable that 2≤Wc/tm≤10 is satisfied. The above-described ratio is an aspect ratio of the fine metal wire 35 and indicates a degree of flatness.

In addition, the above-described ratio is more preferably 3 to 8. That is, it is more preferable that 3≤Wc/tm≤8 is satisfied. Furthermore, the average height of the fine metal wires 35 is tc.

In a case where the ratio of the line width Ws to the line width Wh is less than 2, the bending properties are deteriorated and cracks are likely to occur in the fine metal wire 35. In addition, in a case where the ratio of the line width Ws to the above-described line width Wh is more than 10, the area of a portion that comes into touch increases, and thus, the rub resistance is deteriorated.

In the cross sectional shape shown in FIG. 5, the outer shape of the metal layer 42 is similar to the shape of a surface 42a of the layer 40 to be plated and is arc-shaped. In the fine metal wire 35, the shape of a protruding portion of the metal layer 42 on the opposite side of the surface 24a of the transparent substrate 24 is also referred to as an "apex surface shape". The apex surface shape of the fine metal wire 35 in FIG. 5 is a convex shape.

The configuration of the fine metal wire 35 is not limited to the configuration shown in FIG. 5. As in the fine metal wire 35 shown in FIG. 6, the cross sectional shape of a cross section in the direction $D_2$ (see FIG. 4) of the layer 41 to be plated may be, for example, a trapezoidal shape. In the trapezoidal layer 41 to be plated, the lower bottom on the transparent substrate 24 side is longer than the upper bottom. In addition, the metal layer 43 formed on the layer 41 to be plated has an outer trapezoidal shape in the cross section in the above-described direction $D_2$. The metal layer 43 has a flat apex surface on the upper bottom side of the layer 41 to be plated. The apex surface shape of the fine metal wire 35 in FIG. 6 is a flat shape.

In addition, in the cross sectional shape of a cross section in the direction $D_2$ (see FIG. 4) of the metal layer 45 formed on the arc-shaped layer 40 to be plated as in the fine metal wire 35 shown in FIG. 7, the fine metal wire 35 may be configured to have a concave part 46 at a central part 45c of a surface 45a of the fine metal wire 35 on the opposite side to the transparent substrate 24 side. By providing the above-described concave part 46, for example, during transport, a contact area between the transport roller and the metal layer is reduced and the rub resistance is further improved while the electric resistance of the fine metal wire 35 can be reduced. Therefore, the sensitivity of the touch sensor is improved.

In a case where the metal layer 42 shown in FIG. 7 is formed by a plating method, it can be formed, for example, by adjusting the metal ion concentration of a plating liquid, adjusting a reduction rate by the selection of a reducing agent, and adjusting a plating time. The apex surface shape of the fine metal wire 35 in FIG. 7 is a concave shape.

Moreover, as in the fine metal wire 35 shown in FIG. 8, a blackened layer 48 may be further provided on the surface 42a of the metal layer 42 formed on the arc-shaped layer 40 to be plated. The blackened layer 48 is provided on the surface 42a of the metal layer 42 on the opposite side of the layer 40 to be plated. Due to the blackened layer 48, the fine metal wire 35 is more difficult to be visible, and the wire visibility of the fine metal wire 35 is suppressed.

The fine metal wire 35 in FIG. 8 has a configuration where the blackened layer 48 is provided on the surface 42a of the metal layer 42 of the fine metal wire 35 shown in FIG. 5 and the undercoat layer 25 is provided between the transparent substrate 24 and the fine metal wire 35. The apex surface shape of the fine metal wire 35 in FIG. 8 is a convex shape.

The blackened layer 48 may be provided on the surface 43a of the metal layer 43 of the fine metal wire 35 shown in FIG. 6 described above or may be provided on the surface 45a of the metal layer 45 of the fine metal wire 35 shown in FIG. 7 described above.

In addition, the undercoat layer 25 may be provided between the transparent substrate 24 and the fine metal wire 35 shown in FIG. 6, or may be provided between the transparent substrate 24 and the fine metal wire 35 shown in FIG. 7.

The average height tc of the fine metal wires 35 is preferably 200 nm to 2 μm. The average height tc of the fine metal wires 35 is an average length of the fine metal wires 35 in a direction perpendicular to the surface 24a of the transparent substrate 24.

With regard to the average line width Wm of the layers 40 to be plated and the average height tm of the layers 40 to be plated, first, any 10 points are selected along one direction $D_1$ in which the fine metal wire 35 extends as shown in FIG. 4. At each of the selected points, a cross sectional image of a cross section of the fine metal wire 35 in a direction $D_2$ is acquired. That is, a cross sectional image of the fine metal wires 35 as shown in FIG. 5 is acquired. In each cross sectional image of the cross sectional images at the 10 points, a place corresponding to the line width of the layer 40 to be plated is selected. The place corresponding to the line width of the layer 40 to be plated is a place having a maximum line width of the layer 40 to be plated.

The lengths of the selected places corresponding to the line widths of the layer 40 to be plated in a direction parallel to the surface 24a of the transparent substrate 24 are each measured and the average value of the lengths at the 10 points is taken as an average line width Wm of the layers 40 to be plated.

In addition, in each of the cross sectional images of the above-described 10 points, a place corresponding to the height of the layer 40 to be plated is selected. The place corresponding to the height of the layer 40 to be plated is a maximum height of the layer 40 to be plated.

The lengths of the selected places corresponding to the heights of the layer 40 to be plated in a direction perpendicular to the surface 24a of the transparent substrate 24 are each measured and the average value of the lengths at the 10 points is taken as an average height tm of the layers 40 to be plated.

With regard to the average line width Wc of the fine metal wires 35 and the average height tc of the fine metal wires 35, first, any 10 points are selected along the one direction $D_1$ in which the fine metal wire 35 extends as shown in FIG. 4. At each of the selected points, a cross sectional image of a cross section of the fine metal wire 35 in a direction $D_2$ is acquired. That is, a cross sectional image of the fine metal wires 35 as shown in FIG. 5 is acquired. In each of the cross sectional images at the 10 points, a place corresponding to the line width of the fine metal wire 35 is selected. The place corresponding to the line width of the fine metal wire 35 is a place corresponding to a maximum line width of the fine metal wire 35. The maximum line width of the metal layer 42 is shown in FIG. 5.

The lengths of the selected places corresponding to the line widths of the fine metal wire 35 in a direction parallel to the surface 24a of the transparent substrate 24 are each measured and the average value of the lengths at the 10 points is taken as an average line width Wc of the fine metal wires 35.

In addition, in each of the cross sectional images of the above-described 10 cross sectional images, a place corresponding to the height of the fine metal wires 35 is selected. The place corresponding to the height of the fine metal wire 35 is a place corresponding to a maximum height of the fine metal wire 35. The maximum height of the metal layer 42 is shown in FIG. 5.

The lengths of the selected place corresponding to the height of the fine metal wire 35 in a direction perpendicular to the surface 24a of the transparent substrate 24 are each measured and the average value of the lengths at the 10 points is taken as an average height tc of the fine metal wires 35.

In the cross sectional shape, the line width Ws of the layer 40 to be plated closest to the transparent substrate 24 side is a line width of the surface 24a of the transparent substrate 24 in FIG. 5. Therefore, the line width Ws is the same as the average line width Wm of the layers 40 to be plated in FIG. 5.

In a case where the undercoat layer 25 is provided as shown in FIG. 8, the line width Ws of the layer 40 to be plated closest to the transparent substrate 24 side is a line width of the surface 25a of the undercoat layer 25. The line width Ws is the same as the average line width Wm of the layers 40 to be plated in FIG. 8.

The position th of 9/10 of the average height tm of the layers 40 to be plated is a position of 9/10 of the average height tm of the layers 40 to be plated measured as described above.

In each cross sectional image of the above-described 10 cross sectional images, a place corresponding to the line width Wh of the layer 40 to be plated at the position of 9/10 is selected.

The lengths of the selected places in a direction parallel to the surface 24a of the transparent substrate 24 are measured, and the average value of the lengths of the 10 places is taken as a line width Wh of the layer 40 to be plated at the position of 9/10. Therefore, the apex surface width is also an average value.

(Method for Producing Fine Metal Wire)

Figure 9:
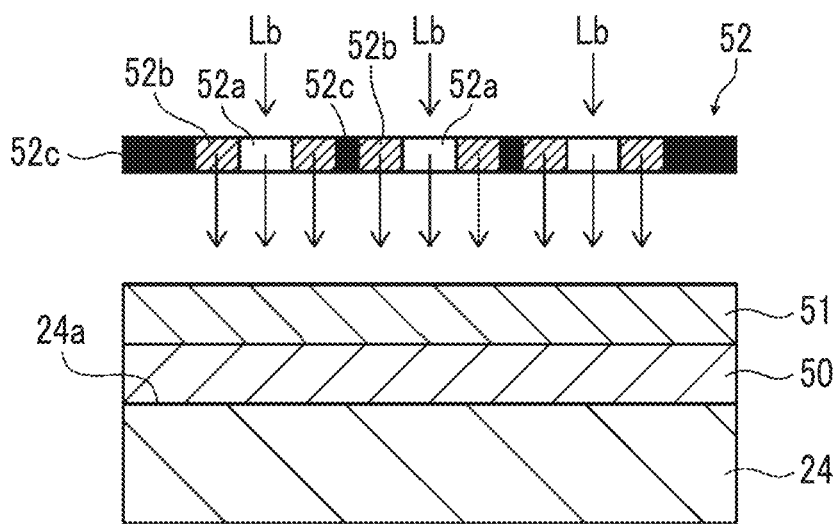
FIG. 9 is a schematic cross sectional view showing one step of one example of a method for producing the layer to be plated of a fine metal wire of the touch sensor of the embodiment of the present invention.
Figure 10:
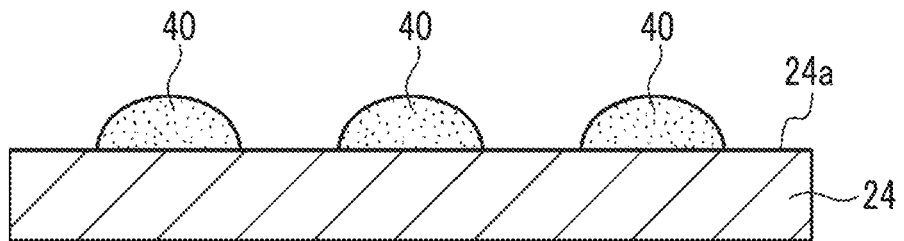
FIG. 10 is a schematic cross sectional view showing one step of one example of a method for producing the layer to be plated of the fine metal wire of the touch sensor of the embodiment of the present invention.

FIGS. 9 and 10 are each a schematic cross sectional view showing one example of a method for producing the layer to be plated of the fine metal wire of the touch sensor of the embodiment of the present invention in the order of steps.

Figure 11:
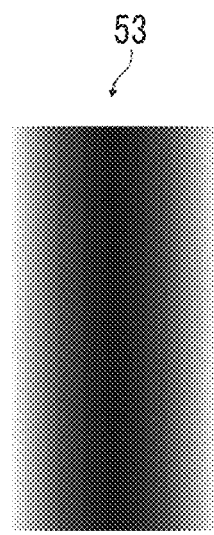
FIG. 11 is a schematic view showing a first example of a halftone mask that is used in the method for producing the layer to be plated of the fine metal wire of the touch sensor of the embodiment of the present invention.
Figure 12:
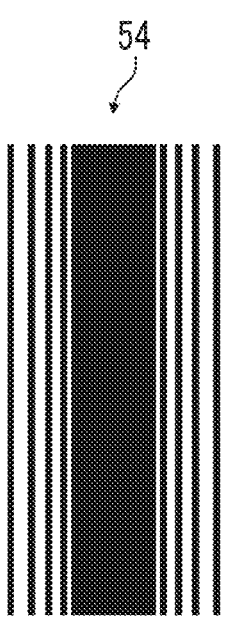
FIG. 12 is a schematic view showing a second example of the halftone mask that is used in the method for producing the layer to be plated of the fine metal wire of the touch sensor of the embodiment of the present invention.
Figure 13:
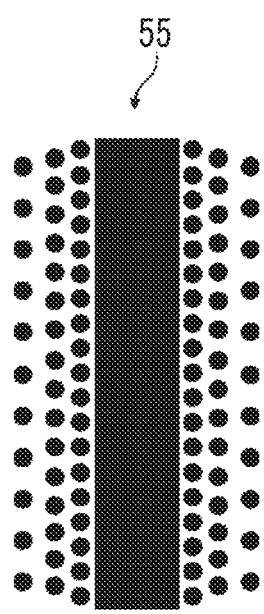
FIG. 13 is a schematic view showing a third example of the halftone mask that is used in the method for producing the layer to be plated of the fine metal wire of the touch sensor of the embodiment of the present invention.

FIG. 11 is a schematic view showing a first example of a halftone mask that is used in the method for producing the layer to be plated of the fine metal wire of the touch sensor of the embodiment of the present invention. FIG. 12 is a schematic view showing a second example of the halftone mask that is used in the method for producing the layer to be plated of the fine metal wire of the touch sensor of the embodiment of the present invention. Further, FIG. 13 is a schematic view showing a third example of the halftone mask that is used in the method for producing the layer to be plated of the fine metal wire of the touch sensor of the embodiment of the present invention.

In FIGS. 9 to 13, the same reference numerals are assigned to the same configuration components as those in FIG. 5, and detailed description thereof will not be repeated.

A composition for forming a layer to be plated is applied to the surface 24a of the transparent substrate 24 and then dried to form a composition layer 50 for forming a layer to be plated on the surface 24a of the transparent substrate 24 as shown in FIG. 9. Next, a protective film 51 is bonded onto the composition layer 50 for forming a layer to be plated.

While the protective film 51 is bonded to the composition layer 50, the composition layer 50 for forming a layer to be plated is exposed.

Examples of the exposure include an exposure method using a mask 52 shown in FIG. 9. A known light source can be used as a light source of actinic rays Lb. The known light source is, for example, a light source that effectively emits ultraviolet rays or visible light, such as a carbon arc lamp, a mercury vapor arc lamp, an ultra-high-pressure mercury lamp, a high-pressure mercury lamp, and a xenon lamp. In addition, as the light source of the actinic rays Lb, a light source that effectively emits ultraviolet rays, visible light, or the like, such as an Ar ion laser and a semiconductor laser, can be used. Further, as the light source of the actinic rays Lb, a light source that effectively emits visible light, such as a floodlight bulb for photography or a solar lamp, can also be used.

The mask 52 shown in FIG. 9 has, for example, a pattern in which the amount of transmitted light, that is, the exposure amount is different, depending on the layer 40 to be plated shown in FIG. 5. The mask 52 includes a light transmitting unit 52a having the largest amount of transmitted light, a gradation unit 52b in which the amount of transmitted light gradually increases, and a light shielding unit 52c that shields the actinic rays Lb toward the layer 40 to be plated. The gradation unit 52b and the light shielding unit 52c are disposed in this order around the light transmitting unit 52a.

The light transmitting unit 52a transmits a larger amount of the actinic rays Lb than the gradation unit 52b. The mask 52 has a configuration in which the concentration gradually increases toward both edge portions of a region where the layer 40 to be plated is formed.

Using the above-described mask 52, the amount of transmitted light, that is, the exposure amount with respect to the composition layer 50 for forming a layer to be plated is controlled for each portion of the composition layer 50 for forming a layer to be plated. The composition layer 50 for forming a layer to be plated in a portion covered by the light transmitting unit 52a having the largest amount of transmitted light of the mask 52 is cured, and the composition layer 50 for forming a layer to be plated in a portion covered by the light shielding unit 52c of the mask 52 is left uncured. Then, the composition layer 50 for forming a layer to be plated in a portion covered by a gradation unit 52b is semi-cured so that the degree of curing gradually decreases as a distance thereof from the light transmitting unit 52a increases. As a result, the portion has a convex shape as in the layer 40 to be plated shown in FIG. 5.

In addition, a method for applying the actinic rays Lb in the same manner as in the exposure method using the mask 52 by a direct drawing method using a laser exposure method or the like may be adopted.

In a case where the protective film 51 is transparent with respect to the actinic rays Lb, the actinic rays Lb can be applied through the protective film 51.

In addition, in a case where the transparent substrate 24 is transparent with respect to the actinic rays Lb, the composition layer 50 for forming a layer to be plated can be irradiated with the actinic rays Lb through the transparent substrate 24 from the transparent substrate 24 side. However, from the viewpoint of a resolution, it is preferable that the actinic rays Lb are applied from the composition layer 50 side for forming a layer to be plated.

In the developing step, for example, the composition layer 50 for forming a layer to be plated is removed in inverse proportion to the exposure amount. Specifically, in a case where the transparent protective film 51 is present on the composition layer 50 for forming a layer to be plated, the protective film 51 is first removed, and then the composition layer 50 for forming a layer to be plated is removed in inverse proportion to the exposure amount by wet development. As a result, the composition layer 50 for forming a layer to be plated in the portion covered by the light transmitting unit 52a of the mask 52 remains as it is, and as shown in FIG. 10, a convex-shaped layer 40 to be plated is formed on the surface 24a of the transparent substrate 24. In addition, all the portions covered by the light shielding unit 52c of the mask 52 are removed and the layer to be plated is not formed.

The portion covered by the gradation unit 52b of the mask 52 remains depending on the degree of the exposure amount and has a convex shape.

The wet development is carried out, for example, by a known method such as spraying, rocking immersion, brushing, and scraping, using a developer matching with a composition for forming a layer to be plated, such as an alkaline aqueous solution, an aqueous developer, or an organic solvent developer.

As the developer, a developer which is safe and stable and has good operability, such as an alkaline aqueous solution, is used. As a base for the alkaline aqueous solution, for example, an alkali hydroxide such as a hydroxide of lithium, sodium, or potassium; an alkali carbonate such as a carbonate or bicarbonate of lithium, sodium, potassium, or ammonium; an alkali metal phosphate such as potassium phosphate and sodium phosphate; an alkali metal pyrophosphate such as sodium pyrophosphate and potassium pyrophosphate; or the like is used. In addition, an aqueous developer consisting of water or an alkaline aqueous solution and one or more kinds of organic solvents can be used. Further, two or more kinds of the above-described developers may be used in combination, as necessary.

Examples of the developing method include a dipping method, a puddling method, a spraying method, brushing, and slapping. Among these, it is preferable to use a high-pressure spraying method from the viewpoint of improving the resolution.

Furthermore, a trapezoidal layer to be plated shown in FIG. 6 can also be formed by changing the configuration of the mask 52.

A metal layer 42 (see FIG. 5) is formed on the layer 40 to be plated with regard to the transparent substrate 24 in which the layer 40 to be plated is formed on the surface 24a as shown in FIG. 10.

The metal layer 42 is formed using a plating method. Therefore, the metal layer 42 is a metal plating layer.

In the plating method, for example, the layer 40 to be plated is subjected to a catalyst treatment of applying a plating catalyst. Next, the transparent substrate 24 in which the layer 40 to be plated is formed on the surface 24a is, for example, immersed in an electroless plating liquid to form a plating layer on a surface of the layer 40 to be plated. In this manner, the metal layer 42 shown in FIG. 5 is formed, thereby forming the fine metal wire 35.

Furthermore, in a case where the undercoat layer 25 (see FIG. 8) is provided, the undercoat layer 25 is formed on the surface 24a of the transparent substrate 24, and then a composition layer 50 for forming a layer to be plated is formed on the surface 25a of the undercoat layer 25 (see FIG. 9). Thereafter, as described above, a plating layer is formed on a surface of the layer 40 to be plated to form the metal layer 42, thereby forming the fine metal wire 35.

In a case where there is a blackened layer, the blackened layer is formed after the formation of the fine metal wire 35. The formation of the blackened layer is not particularly limited, and a known method can be used as appropriate. For example, the blackened layer can be provided by performing a blackening treatment in which a surface of the fine metal wire 35 is subjected to a sulfurization or oxidation treatment.

Furthermore, the mask 52 is not limited to the configuration shown in FIG. 9, and may have a pattern in which the amount of transmitted light gradually increases toward both sides, as in the mask 53 shown in FIG. 11, for example. A stripe pattern in which a stripe interval is gradually widened as in a mask 54 shown in FIG. 12 may be adopted. A dot pattern in which a dot interval is gradually widened as in a mask 55 shown in FIG. 13 may be adopted.

The halftone masks 53, 54, and 55 shown in FIGS. 11 to 13 are masks that are used in a case where a photosensitive material of the layer to be plated, that is, the composition layer for forming a layer to be plated is a positive type. In a case where the photosensitive material of the layer to be plated, that is, the composition layer for forming a layer to be plated is a negative type in which the light-irradiated region is cured, a mask in which black and white of the halftone masks 53, 54, and 55 shown in FIGS. 11 to 13 are reversed is used.

Hereinafter, each part of the touch sensor and the touch panel will be described.

Transparent Substrate

The transparent substrate supports the fine metal wire, and supports the first detection electrode and the second detection electrode composed of the fine metal wires. In addition, the transparent substrate supports the first peripheral wire and the second peripheral wire. In addition, in a case where the first detection electrode is disposed on one surface of both surfaces of the transparent substrate and the second detection electrode is disposed on the other surface thereof, the substrate electrically insulates the first detection electrode and the second detection electrode from each other. For the transparent substrate, for example, a transparent insulating substrate is used. Examples of the material of the transparent substrate include a transparent resin material and a transparent inorganic material. The transparent substrate preferably has a thickness of 20 to 50 µm.

The transparent substrate is preferably a polyethylene terephthalate (PET) film from the viewpoint of cost. In a case where heat resistance is required, a polyethylene naphthalate (PEN) film or a polyimide-based film can be used. In addition to this, it is possible to use a film having a thickness in a range of 20 to 50 µm, which is produced from a polyethylene resin, a polypropylene-based resin, a methacrylic resin, a cyclic polyolefin-based resin, a polystyrene-based resin, an acrylonitrile-(poly)styrene copolymer (an AS resin), an acrylonitrile-butadiene-styrene copolymer (an ABS resin), a polyvinyl chloride-based resin, a poly(meth) acrylic resin, a polycarbonate-based resin, a polyester-based resin, a polyamide-based resin, a polyamideimide-based resin, or the like as the transparent substrate.

The total light transmittance of the transparent substrate is preferably 40% to 100%, and more preferably 85% to 100%. The total light transmittance is measured using, for example, "Plastics—Determination of total light transmittance and reflectance" specified in Japanese Industrial Standards (JIS) K 7375: 2008.

Undercoat Layer

The undercoat layer further improves the adhesiveness among the first detection electrode, the second detection electrode, the first peripheral wire, and the second peripheral wire. The thickness of the undercoat layer is preferably 0.01 to 1 µm. The undercoat layer preferably includes a surfactant having at least one of a fluorine atom or a silicon atom. The content of the surfactant in the undercoat layer is 0.01% to 5% by mass, and preferably 0.04% to 1.50% by mass with respect to the total mass of the undercoat layer.

Surfactant

The type of the surfactant is not particularly limited, a known surfactant can be used, and specifically, at least one surfactant selected from a silicone-based surfactant or a fluorine-based surfactant is preferable.

Furthermore, the surfactant is preferably an oligomer or polymer rather than a low-molecular-weight compound.

In a case where a surfactant is added, the surfactant rapidly moves on the surface of an applied coating film and is unevenly distributed, the surfactant remains unevenly distributed on the surface even after the coating film is dried, and therefore, the surface energy of the film to which the surfactant has been added is reduced by the surfactant. From the viewpoint of preventing non-uniformity in film thickness, cissing, and unevenness, it is preferable that the film has a low surface energy.

Preferred examples of the silicone-based surfactant include a polymer or oligomer including a plurality of dimethylsilyloxy units as repeating units and having a substituent at the terminal and/or in a side chain. The polymer or oligomer including dimethylsilyloxy as a repeating unit may include a repeating unit other than dimethylsilyloxy. These substituents may be the same as or different from each other, and it is preferable that the compound has a plurality of such substituents. Preferred examples of the substituent include groups including a polyether group, an alkyl group, an aryl group, an aryloxy group, a cinnamoyl group, an oxetanyl group, a fluoroalkyl group, a polyoxyalkylene group, or the like.

The number-average molecular weight of the silicone-based surfactant is not particularly limited, but is preferably 100,000 or less, more preferably 50,000 or less, still more preferably 1,000 to 30,000, and particularly preferably 1,000 to 20,000.

The fluorine-based surfactant is preferably a compound having a combination of a fluoroaliphatic group with, for example, a solvophilic group that contributes to the affinity for various compositions for coating, molding materials, and the like in a case where this surfactant is used as an additive, in the same molecule, and such the compound can be generally obtained by copolymerizing a monomer having a fluoroaliphatic group and a monomer having a solvophilic group.

Representative examples of the monomer having a solvophilic group, which is copolymerized with the monomer having a fluoroaliphatic group, include poly(oxyalkylene) acrylate and poly(oxyalkylene) methacrylate.

From the viewpoint that the surfactant stays on the surface of the undercoat layer, a surfactant having an ionizing radiation-curable group is preferable.

The undercoat layer may include other materials in addition to the above-described surfactant.

The undercoat layer may include a resin (binder resin). The resin functions as a binder of the undercoat layer.

The type of the resin is not particularly limited, and a known resin can be used. Examples of the resin include a polyester resin, a polyether resin, a (meth)acrylic resin, an epoxy resin, a urethane resin, an alkyd resin, a spiroacetal resin, a polybutadiene resin, and a polythiol polyene resin, and the (meth)acrylic resin is preferable.

The content of the resin in the undercoat layer is not particularly limited, but is preferably 40% to 95% by mass, more preferably 50% to 90% by mass, and still more preferably 50% to 80% by mass with respect to the total mass of the undercoat layer.

The undercoat layer may further include inorganic particles. The type of the inorganic particles is not particularly limited, and examples of the inorganic particles include inorganic particles including at least one selected from the group consisting of silica, titanium oxide, zirconium oxide, or aluminum oxide.

A particle diameter of the inorganic particles is not particularly limited, but is preferably 5 to 100 nm, and more preferably 10 to 80 nm.

The content of the inorganic particles in the undercoat layer is not particularly limited, but is preferably 5% to 60% by mass, more preferably 10% to 50% by mass, and still more preferably 10% to 45% by mass with respect to the total mass of the undercoat layer.

A method for forming the undercoat layer is not particularly limited, but examples thereof include a method of applying a composition for forming an undercoat layer, as described later. It is preferable that a transparent substrate is stretched after the application of a composition for forming an undercoat layer from the viewpoint of improving the adhesiveness between the transparent substrate and the undercoat layer.

It is preferable that the composition for forming an undercoat layer includes the above-described surfactant. The content of the surfactant is adjusted so that the content of the surfactant in the undercoat layer is within the range.

The composition for forming an undercoat layer may include other materials in addition to the surfactant.

Examples of such other materials include the above-described resin and inorganic particles.

Examples of such other materials also include a solvent. Examples of the solvent include water and an organic solvent.

In addition, the composition for forming an undercoat layer may include a monomer. The undercoat layer can be formed by applying a composition for forming an undercoat layer including a monomer and subjecting the coating film to a curing treatment (for example, a light irradiation treatment and a heating treatment).

Furthermore, the composition for forming an undercoat layer may further include a polymerization initiator. Examples of the polymerization initiator include known photopolymerization initiators and thermal polymerization initiators.

The type of the monomer is not particularly limited, and a monomer that can constitute the above-described resin is selected.

Among these, a compound having a photopolymerizable functional group is preferable as the monomer.

Examples of the photopolymerizable functional group include a polymerizable unsaturated group (carbon-carbon unsaturated double bond group) such as a (meth)acryloyl group, a vinyl group, a styryl group, and an allyl group, and among these, the (meth)acryloyl group is preferable.

Fine Metal Wire

As described above, the fine metal wire 35 is a metal wire that constitutes the first detection electrode 30 (see FIG. 2), the first peripheral wire 23a (see FIG. 2), the second detection electrode 32 (see FIG. 2), and the second peripheral wire 23b (see FIG. 2).

Metal Layer

The metal layer of the fine metal wire 35 is composed of, for example, a metal such as gold (Au), silver (Ag), copper (Cu), and aluminum (Al), an alloy, and the like. From the viewpoint that the fine metal wire has an excellent conductivity, among those, the metal layer is preferably composed of silver or copper, and more preferably composed of copper or a copper alloy. In addition, the metal layer is not limited to being composed of a simple metal body, and may have a multilayer structure of only metals, which does not include a layer of an oxide and the like.

In a case where the metal layer is composed of copper, examples of the material thereof include a simple copper body (metallic copper) and a mixture (a copper alloy) including copper and a metal other than copper, and the simple copper body is preferable. Examples of the metal other than copper included in the copper alloy include silver, gold, aluminum, nickel, molybdenum, chromium, and palladium.

The metal layer of the fine metal wire is formed using a plating method.

A method for forming the metal layer by a plating method will be described. The metal layer can be composed of a metal plating film formed on a layer to be plated by subjecting the layer to be plated to electroless plating. In this case, the metal layer is formed by forming a catalyst ink including at least metal fine particles on a substrate in a patterned manner and immersing a transparent substrate in an electroless plating bath to form a metal plating film. More specifically, the method for producing a metal-coated substrate described in JP2014-159620A can be used. In addition, the metal layer is formed by forming a resin composition having at least a functional group capable of interacting with a metal catalyst precursor into a patterned shape on a substrate, then applying a catalyst or a catalyst precursor thereto, and immersing the substrate in an electroless plating bath to form a metal plating film. More specifically, the method for producing a metal-coated substrate described in JP2012-144761A can be applied. The patterned shape includes a mesh pattern.

As the plating method, only electroless plating may be carried out or electrolytic plating may be carried out after electroless plating. The plating may be repeated a plurality of times, and the metal to be plated at the time may be a different metal.

Mesh Pattern

The first detection electrode 30 and the second detection electrode 32 are composed of the fine metal wires 35 as described above. A mesh pattern formed by a plurality of the fine metal wires 35 intersecting with each other as shown in FIGS. 3 and 4 is composed of, for example, the first detection electrode 30 and the second detection electrode 32.

In the first detection electrode 30 and the second detection electrode 32, a mesh pattern composed of the fine metal wires 35 has an opening ratio of preferably 90% or more, and more preferably 95% or more from the viewpoint of visible light transmittance. The opening ratio corresponds to a transmissive portion excluding the fine metal wire in the region where the conductive layer is provided, that is, a proportion of the opening portion to the entire region where the conductive layer is provided.

Furthermore, the first peripheral wire 23a and the second peripheral wire 23b may have a mesh pattern which is formed by a plurality of the fine metal wires 35 intersecting with each other.

In a case where the first detection electrode 30 and the second detection electrode 32 as well as the first peripheral wire 23a and the second peripheral wire 23b have a configuration having a mesh pattern, the pattern of the mesh pattern is not particularly limited and is preferably a geometric shape that is obtained by combining a triangle such as a regular triangle, an isosceles triangle, and a right triangle, a quadrangle such as a square, a rectangle, a rhombus, a parallelogram, and a trapezoid, an (regular) n-polygon such as a (regular) hexagon and a (regular) octagon, a circle, an ellipse, and a star shape.

The mesh of the mesh pattern is intended to be a shape including a plurality of opening portions 36 composed of the intersecting fine metal wires 35. The opening portion 36 is an opening region surrounded by the fine metal wires 35. In FIG. 3, the opening portion 36 has a rhombus shape, but it may have another shape. For example, the shape may be a polygonal shape (for example, a triangle, a quadrangle, a hexagon, and a random polygonal shape). In addition, the shape of one side may be a curved shape or may be a circular arc shape in addition to a straight line shape. In the case of the circular arc shape, for example, two sides facing each other may have a circular arc shape protruding outward, and the other two sides facing each other may have a circular arc shape protruding inward. In addition, the shape of each of the sides may be a wavy line shape in which a circular arc protruding outward and a circular arc protruding inward are continuous. Needless to say, the shape of each of the sides may be a sine curve. The mesh pattern is not particularly limited, and may be a random pattern or a regular pattern or may be a regular mesh pattern in which a plurality of congruent shapes are repeatedly disposed.

The mesh pattern is preferably a regular mesh pattern having the same rhombic lattice. The length of one side of the rhombus, that is, the length W of one side of the opening portion 36 (see FIGS. 3 and 4) is preferably 50 to 1,500 μm, more preferably 150 to 800 μm, and still more preferably 200 to 600 μm from the viewpoint of visibility. In a case where the length W of one side of the opening portion 36 is within the above-described range, good transparency can be also further maintained, and a display can be visible without a sense of discomfort, in a case where the touch sensor 12 (see FIG. 1) is attached onto the display surface 14a (see FIG. 1) of the image display unit 14 (see FIG. 1).

Furthermore, the mesh pattern of the fine metal wire can be observed and measured using an optical microscope (Digital Microscope VHX-7000, manufactured by KEYENCE CORPORATION).

Blackened Layer

The blackened layer reduces, for example, a reflectivity of the fine metal wire 35. The blackened layer 48 can be composed of copper nitride, copper oxide, copper oxynitride, molybdenum oxide, AgO, Pd, carbon, or other nitrides or oxides. The blackened layer is formed on the surface 42a of the metal layer 42 of the fine metal wire 35 that is disposed on a side where the fine metal wire is visible, that is, the surface 24a side of the transparent substrate 24.

Layer to be Plated

The layer to be plated includes an organic component as a main component.

The layer to be plated is a layer on which a metal layer is formed on the layer by performing a plating treatment.

Inclusion of the organic component as a main component means that the content of the organic component with respect to a total mass of the layer to be plated is more than 50% by mass, and the content is preferably 80% by mass or more, and more preferably 90% by mass or more. The upper limit thereof is not particularly limited and is, for example, 100% by mass.

It is preferable that the layer to be plated is a layer having a functional group (hereinafter also referred to as an "interactive group") that interacts with a plating catalyst or a precursor thereof.

The interactive group means a functional group that can interact with a plating catalyst or a precursor thereof, which is applied to the layer to be plated, and examples thereof include a functional group which can form an electrostatic interaction with the plating catalyst or a precursor thereof, and a nitrogen-containing functional group, a sulfur-containing functional group, and an oxygen-containing functional group, which can form a coordination with the plating catalyst or a precursor thereof.

From the viewpoints of a high polarity and a high adsorption ability to the plating catalyst or a precursor thereof, as the interactive group, an ionic polar group such as a carboxylic acid group, a sulfonic acid group, a phosphoric acid group, and a boronic acid group, and a cyano group are preferable, and the carboxylic acid group or the cyano group is more preferable.

The layer to be plated usually includes a compound having the above-described interactive group. The compound is preferably a polymer. That is, the layer to be plated preferably includes a polymer including a repeating unit having an interactive group.

It is preferable that the layer to be plated includes a plating catalyst or a precursor thereof.

As the plating catalyst or a precursor thereof, an electroless plating catalyst or a precursor thereof is preferable.

The electroless plating catalyst is not particularly limited as long as it serves as an active nucleus during electroless plating, and examples thereof include a metal having a catalytic ability for an autocatalytic reduction reaction (known as a metal capable of electroless plating having a lower ionization tendency than Ni). Specific examples thereof include Pd, Ag, Cu, Pt, Au, and Co.

A method for producing the layer to be plated is not particularly limited, and examples thereof include a method in which a composition for forming a layer to be plated is brought into touch with a transparent substrate to form a precursor layer of a layer to be plated, the precursor layer of a layer to be plated is subjected to an exposure treatment and a development treatment to form a patterned layer to be plated, and further, a plating catalyst or a precursor thereof is applied to the obtained layer to be plated.

The composition for forming a layer to be plated includes the following compound X or composition Y.

Compound X: A compound having an interactive group and a polymerizable group

Composition Y: A composition including a compound having an interactive group and a compound having a polymerizable group The compound X is a compound having an interactive group and a polymerizable group. The definition of the interactive group is as described above.

The compound X may have two or more interactive groups.

The polymerizable group is a functional group capable of forming a chemical bond by energy application, and examples thereof include a radically polymerizable group and a cationically polymerizable group. Among these, the radically polymerizable group is preferable from the viewpoint of a more excellent reactivity. As the radically polymerizable group, a methacryloyloxy group, an acryloyloxy group, or a styryl group is more preferable.

The compound X may have two or more polymerizable groups. In addition, the number of the polymerizable groups contained in the compound X is not particularly limited and may be one or two or more.

The compound X may be a low-molecular-weight compound or a high-molecular-weight compound. The low-molecular-weight compound is intended to mean a compound having a molecular weight of less than 1,000, and the high-molecular-weight compound is intended to mean a compound having a molecular weight of 1,000 or more.

In a case where the compound X is a polymer, the weight-average molecular weight of the polymer is not particularly limited and is preferably 1,000 to 700,000, and more preferably 2,000 to 200,000 from the viewpoint of more excellent handleability such as a solubility.

A method for synthesizing such a polymer having a polymerizable group and an interactive group is not particularly limited, and a known synthesis method (refer to paragraphs [0097] to [0125] of JP2009-280905A) is used.

The composition Y is a composition that includes a compound having an interactive group and a compound having a polymerizable group. That is, the composition Y includes two kinds of compounds of a compound having an interactive group and a compound having a polymerizable group. The definitions of the interactive group and the polymerizable group are as described above.

The compound having an interactive group may be a low-molecular-weight compound or a high-molecular-weight compound. Furthermore, the compound having an interactive group may include a polymerizable group.

Preferred aspects of the compound having an interactive group include a polymer including a repeating unit having an interactive group (for example, a polyacrylic acid).

Preferred aspects of the polymer including a repeating unit having an interactive group include a polymer X having a repeating unit derived from a conjugated diene compound and a repeating unit derived from an unsaturated carboxylic acid or a derivative thereof since a layer to be plated is easily formed with a small energy application amount (for example, an exposure amount).

The conjugated diene compound is not particularly limited as long as it is a compound having a molecular structure which has two carbon-carbon double bonds separated by one single bond.

The repeating unit derived from a conjugated diene compound is preferably a repeating unit derived from a compound having a butadiene skeleton. Examples of the compound having the butadiene skeleton (a monomer having a butadiene structure) include 1,3-butadiene, isoprene, 2-ethyl-1,3-butadiene, 2-n-propyl-1,3-butadiene, 2,3-dimethyl-1,3-butadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, and 2-cyano-1,3-butadiene.

The content of the repeating unit derived from the conjugated diene compound in the polymer X is preferably 25% to 75% by mole with respect to all repeating units.

The content of the repeating unit derived from the unsaturated carboxylic acid or the derivative thereof in the polymer X is preferably 25% to 75% by mole with respect to all repeating units.

The compound having a polymerizable group is a so-called monomer, and a polyfunctional monomer having two or more polymerizable groups is preferable from the viewpoint that the hardness of a patterned layer to be plated thus obtained is more excellent. Specifically, the polyfunctional monomer is preferably a monomer having 2 to 6 polymerizable groups. The molecular weight of the polyfunctional monomer used is preferably 150 to 1,000, and more preferably 200 to 800 from the viewpoint of the mobility of molecules during the crosslinking reaction that affects the reactivity.

The composition for forming a layer to be plated may include components other than the above-described components.

For example, the composition for forming a layer to be plated may include a polymerization initiator. The type of the polymerization initiator is not particularly limited, and examples thereof include a known polymerization initiator (preferably a photopolymerization initiator).

The composition for forming a layer to be plated may include a solvent. The type of the solvent is not particularly limited and examples thereof include water and an organic solvent. Examples of the organic solvent include known organic solvents (for example, an alcohol-based solvent, an ester-based solvent, a ketone-based solvent, a halogen-based solvent, and a hydrocarbon-based solvent).

In the exposure treatment to which the precursor layer of a layer to be plated is subjected, the precursor layer of a layer to be plated is irradiated with light in a patterned shape so as to obtain a desired patterned layer to be plated. The type of light used is not particularly limited and examples thereof include ultraviolet light and visible light. In a case of performing light irradiation in a patterned shape, it is preferable to perform light irradiation using a mask having an opening portion having a predetermined shape.

In the exposed portion of the precursor layer of a layer to be plated, the polymerizable group included in the compound in the precursor layer of a layer to be plated is activated, crosslinking between the compounds occurs, and curing of the layer proceeds.

Next, by performing a development treatment on the precursor layer of a layer to be plated subjected to the curing treatment in the patterned shape, an unexposed portion is removed and thus a patterned layer to be plated is formed.

Since the layer to be plated has the above-described interactive group, the interactive group attaches (adsorbs) the applied plating catalyst or precursor thereof according to the function thereof.

Examples of the method for applying the plating catalyst or a precursor thereof to the layer to be plated include a method in which a solution in which the plating catalyst or a precursor thereof is dispersed or dissolved in a solvent is prepared, and the solution is applied to the layer to be plated, and a method in which a substrate with the layer to be plated is immersed in the solution.

The touch sensor may be used in the form of a laminate having a touch sensor and other members such as a pressure-sensitive adhesive sheet and a peeling sheet during handling and transportation. The peeling sheet functions as a protective sheet for preventing the occurrence of scratching on the conductive member during transportation of the laminate. In addition, the touch sensor may be handled, for example, in the form of a composite including the touch sensor, a pressure-sensitive adhesive sheet, and a protective layer in this order.

The present invention is basically configured as described above. Hereinabove, the touch sensor of the embodiment of the present invention has been described in detail. However, the present invention is not limited to the above-described embodiments, and of course, various improvements or modifications may be made within a range not departing from the scope of the present invention.

EXAMPLES

Hereinafter, the characteristics of the present invention will be described in detail with reference to Examples. The materials, reagents, amounts and ratios of substances, operations, and the like shown in the following Examples can be appropriately changed without departing from the spirit and scope of the present invention. Therefore, the scope of the present invention should not be construed as being limited to the following Examples.

In the present Examples, touch sensors of Examples 1 to 10 and Comparative Examples 1 to 6 were manufactured, and rub resistance, bending properties, and a moire thereof were evaluated.

Example 1

Preparation of Composition for Forming Layer to be Plated

The following respective components were mixed to obtain a composition for forming a layer to be plated.
  Isopropanol 38 parts by mass
  Polybutadiene maleic acid (butadiene-maleic acid alternating copolymer, repeating units derived from butadiene:repeating units derived from maleic acid=1:1 (molar ratio), manufactured by Polysciences, Inc. 4 parts by mass
  FAM-201 (bifunctional acrylamide, manufactured by FUJIFILM Corporation) 1 part by mass
  IRGACURE-OXE02 (Oxime ester-based polymerization initiator, manufactured by BASF) 0.05 parts by mass
Manufacture of Substrate with Layer to be Plated As a transparent substrate, a polyester film (COSMOSHINE (registered trademark) A4360, manufactured by TOYOBO Co., Ltd.) with easy-adhesive layers on both sides, having a thickness of 50 μm, was prepared. The composition for forming a layer to be plated was applied with a bar on one surface of the transparent substrate such that the thickness was about 0.3 μm. After the application of the composition, the composition was dried at a temperature of 120° C. for 1 minute to obtain a substrate with a precursor layer of a layer to be plated. Then, a protective film made of polypropylene having a thickness of 12 μm was bonded to the surface of the precursor layer of a layer to be plated.

Next, an exposure mask having a square mesh-like opening pattern (a pitch of 300 μm) in which the line width of a thin wire portion was 0.9 μm and the concentration gradually increased toward both edge portions was disposed on the substrate with the precursor layer of a layer to be plated, having the protective film bonded thereto. Next, UV light was irradiated at 30 mJ/cm2 using a high-pressure mercury lamp through the exposure mask.

In the exposure mask of Example 1, the black and white of the halftone mask 53 shown in FIG. 11 were reversed.

After the irradiation with UV light, the protective film was peeled off from the substrate with the precursor layer of a layer to be plated. The substrate with the precursor layer of a layer to be plated, from which the protective film had been peeled off, was shower-washed with a 1% by mass aqueous sodium carbonate solution and subjected to an alkali development treatment to obtain a substrate with a mesh-like layer to be plated.

In a cross section of the fine wire composed of the mesh-like layer to be plated taken in a direction orthogonal to the extending direction, the average height of the layers to be plated was 0.28 μm, the average line width of the layers to be plated was 0.85 μm, and the apex surface width of the layer to be plated was 0.25 μm. In addition, the cross sectional shape of the layer to be plated was a convex shape.

Here, the average line width Wm (see FIG. 5) of the layer to be plated is a width of the layer to be plated on a side closest to the transparent substrate (polyester film), and the apex surface width is a line width Wh (see FIG. 5) of the layer to be plated at a position of 9/10 of the height of the layer to be plated in the direction away from the transparent substrate of the layer to be plated.

For each of the average height of the layers to be plated, the average line width of the layers to be plated, and an apex surface width of the layer to be plated, any 10 points along the extending direction of the fine metal wire are selected. At each of the selected points, an average value of the values at the 10 points obtained by actually measuring the maximum dimension was determined for places corresponding to the average height of the layers to be plated, the average line width of the layers to be plated, and the apex surface width of the layer to be plated from the cross sectional image of a cross section of the fine metal wire in a direction orthogonal to the extending direction. The average values of each place were taken as an average height of the layers to be plated, an average line width of the layers to be plated, and an apex surface width of the layer to be plated.

Manufacture of Substrate (Touch Sensor) with Copper Plating Layer

A Pd catalyst-imparting liquid Omnishield 1573 activator (manufactured by Rohm and Haas Electronic Materials LLC) was diluted with pure water to 3.6% by volume, and the substrate with the layer to be plated was immersed in an aqueous solution with a pH (hydrogen ion exponent) adjusted to 4 with 0.1 N hydrochloric acid at a temperature of 45° C. for 5 minutes. Thereafter, the substrate with the layer to be plated was washed twice with pure water.

Next, the substrate with the layer to be plated was immersed in a 0.8% by volume aqueous solution of a reducing agent CIRCUPOSIT PB Oxide converter 60 C (manufactured by Rohm and Haas Electronic Materials LLC) at a temperature of 30° ° C. for 5 minutes. Thereafter, the substrate with the layer to be plated was washed twice with pure water and subjected to a Pd catalyst treatment.

Next, the substrate with the layer to be plated that had been subjected to the Pd catalyst treatment was immersed in an electroless plating liquid obtained by mixing 12% by volume of an M agent, 6% by volume of an A agent, and 10% by volume of a B agent of CIRCUPOSIT 4500 (manufactured by Rohm and Haas Electronic Materials LLC) at a temperature of 45° C. for 15 minutes. Thereafter, the substrate with the layer to be plated was washed with pure water to form a mesh-like copper plating layer as a metal layer, thereby obtaining a substrate with a mesh-like copper plating layer.

In a cross section of the fine metal wire constituting the mesh-like copper plating layer, taken in a direction orthogonal to the extending direction of the fine metal wire, the average height of the fine metal wires was 0.40 μm, the average line width of the fine metal wires was 1.10 μm, and the apex surface shape of the fine metal wire was a convex shape.

Here, for each of the average height and the average line width of the fine metal wires, any 10 points along the extending direction of the fine metal wire are selected. At each of the selected points, an average value of the values at the 10 points obtained by actually measuring the maximum dimension was determined for places corresponding to the average height and an average line width of the fine metal wires from the cross sectional image of a cross section of the fine metal wire in a direction orthogonal to the extending direction. The average value at each place was taken as an average height and an average line width of the fine metal wire.

Examples 2 to 9 and Comparative Examples 1 to 4

Touch sensors of Examples 2 to 9 and Comparative Examples 1 to 4 were manufactured according to the same procedure as in Example 1, except that in Examples 2 to 9 and Comparative Examples 1 to 4, the thickness of the precursor layer of a layer to be plated, the opening width of the exposure mask, and the immersion time of the electroless plating liquid were adjusted such that each of the dimensions was a value described in Tables 1A and 1B.

Here, the cross sectional shapes of the fine metal wires of Examples 1 to 8 and Comparative Examples 1 to 4 were circular arc shapes shown in FIG. 5. As shown in FIG. 7, the fine metal wire of Example 9 had a configuration where the concave part 46 is provided in the central part 45c of the surface 45a of the fine metal wire 35 on the opposite side to the transparent substrate 24 side. The fine metal wire of Example 9 had a dumbbell-like cross sectional shape.

Example 10

A touch sensor was manufactured in the same manner as in Example 7, except that in Example 10, an exposure mask having a wide opening portion was used as the exposure mask. In the exposure mask of Example 10, the black and white of the halftone mask 53 shown in FIG. 11 were reversed. The cross sectional shape of the layer to be plated of Example 10 was a trapezoidal shape having a flat upper bottom as shown in FIG. 6.

Comparative Example 5

In Comparative Example 5, a touch sensor was manufactured in the same manner as in Example 7, except that an exposure mask having no concentration change in the opening portion was used as the exposure mask.

Comparative Example 6

In Comparative Example 6, a polyester substrate was used as the transparent substrate. In Comparative Example 6, a copper layer was formed on the polyester substrate by a sputtering method. Next, wet etching was performed using a photolithography method to manufacture a touch sensor of Comparative Example 6.

Comparative Example 6 has a configuration where a layer to be plated is not provided. For this reason, in Comparative Example 6, "–" is noted in the column of each item of "Layer to be plated" in Tables 1A and 1B. In addition, "–" is noted in the column of "Average line width of fine metal wires/average line width of layers to be plated" in Tables 1A and 1B. "–" is noted in the column of "Average line width of fine metal wires/average height of layers to be plated".

In all of Examples, the organic component was the main component in the layer to be plated.

Evaluation of Rub Resistance

A test piece for evaluating the rub resistance was manufactured by cutting a substrate with a mesh-like copper plating layer into a size with a width of 30 mm and a length of 240 mm, and attaching resistance measurement electrodes with a width of 30 mm and a length of 10 mm to the both sides in the longitudinal direction.

Here, the mesh-like fine metal wire including the copper plating layer was disposed at 45° with respect to the longitudinal direction of the test piece. This test piece was placed in a flat-type abrasion resistance tester RT-300F (manufactured by Daiei Kagaku Seiki MFG. Co., Ltd.), and an abrasion test of 500 reciprocations was performed under the conditions of a wool felt friction element with a thickness of 3 mm, a friction element area of 20 mm×20 mm, a test load of 200 gf (1.9613 Newtons (N)), a stroke of 120 mm, and a reciprocation speed of 30 times/min. A resistance change before and after carrying out the abrasion test was measured.

A resistance change rate was calculated by an expression of [Amount of resistance change/Resistance value before test] and the rub resistance was evaluated in accordance with the following standard.

A: The resistance change rate is less than 1%
B: The resistance change rate is 1% or more and less than 5%
C: The resistance change rate is 5% or more Evaluation of Bending Resistance A test piece was prepared in the same manner as in the evaluation of rub resistance. By clamping both ends of this test piece, the test piece was wound half around a freely rotating columnar stainless steel roller having a diameter of 20 mm while applying a tension to prevent loosening, and reciprocated at a stroke of 60 mm to perform a bending test. The resistance change before and after the bending test was measured.

The resistance change rate was calculated by an expression of [Amount of resistance change/Resistance value before test] and the bending properties were evaluated in accordance with the following standard.

A: The resistance change rate is less than 1%
B: The resistance change rate is 1% or more and less than 5%
C: The resistance change rate is 5% or more Evaluation of Moire The substrate with a mesh-like copper plating layer was disposed to be closely attached onto a high-definition liquid crystal panel of 7.9 inches of QXGA (width: 2,048×length: 1,536 dots), and visually observed by five evaluators from a position 30 cm away from the liquid crystal panel in a plan view. A moire that had occurred by interference between the substrate with a mesh-like copper plating layer and a pixel pattern of the liquid crystal panel was evaluated in accordance with the following standards, and the evaluation by the most observers was taken as a final evaluation result.

A: The moire is not observed
B: The moire is slightly observed
C: The moire is observed

TABLE 1A

| | Layer to be plated | | | | | Fine metal wire | | |
| --- | --- | --- | --- | --- | --- | --- | --- | --- |
| | Average line width (μm) | Apex surface width (μm) | Average height (μm) | Average line width/ average height | Cross sectional shape | Average line width (μm) | Average height (μm) | Apex surface shape |
| Example 1 | 0.85 | 0.25 | 0.28 | 3.0 | Convex shape | 1.10 | 0.4 | Convex shape |
| Example 2 | 1.16 | 0.36 | 0.30 | 3.9 | Convex shape | 1.51 | 0.5 | Convex shape |
| Example 3 | 1.31 | 0.41 | 0.31 | 4.2 | Convex shape | 1.73 | 0.6 | Convex shape |
| Example 4 | 1.43 | 0.44 | 0.32 | 4.5 | Convex shape | 1.90 | 0.7 | Convex shape |
| Example 5 | 1.85 | 0.55 | 0.33 | 5.6 | Convex shape | 2.42 | 1.0 | Convex shape |
| Example 6 | 1.40 | 0.43 | 0.32 | 4.4 | Convex shape | 1.75 | 0.7 | Convex shape |
| Example 7 | 1.18 | 0.37 | 0.31 | 3.8 | Convex shape | 1.71 | 0.6 | Convex shape |
| Example 8 | 1.15 | 0.35 | 0.32 | 3.6 | Convex shape | 1.74 | 0.7 | Convex shape |
| Example 9 | 1.04 | 0.15 | 0.31 | 3.4 | Convex shape | 1.65 | 0.9 | Concave shape |
| Example 10 | 1.17 | 0.58 | 0.33 | 3.5 | Trapezoidal shape | 1.70 | 0.6 | Flat shape |
| Comparative Example 1 | 0.63 | 0.21 | 0.25 | 2.5 | Convex shape | 0.81 | 0.3 | Convex shape |
| Comparative Example 2 | 2.04 | 0.6 | 0.33 | 6.2 | Convex shape | 2.75 | 1.1 | Convex shape |
| Comparative Example 3 | 1.29 | 0.41 | 0.31 | 4.2 | Convex shape | 1.55 | 0.3 | Convex shape |
| Comparative Example 4 | 1.02 | 0.32 | 0.29 | 3.5 | Convex shape | 1.68 | 0.6 | Convex shape |
| Comparative Example 5 | 1.22 | 1.22 | 0.30 | 4.1 | Rectangular shape | 1.69 | 0.6 | Flat shape |
| Comparative Example 6 | — | — | — | — | — | 1.82 | 0.6 | Flat shape |

TABLE 1B

| | Average line width of fine metal wires/ average line width of layers to be plated | Average line width of fine metal wires/ average height of layers to be plated | Items to be evaluated | | |
| --- | --- | --- | --- | --- | --- |
| | | | Rub resistance | Bending properties | Moire |
| Example 1 | 1.29 | 3.9 | B | A | A |
| Example 2 | 1.30 | 5.0 | A | A | A |
| Example 3 | 1.32 | 5.6 | A | A | A |
| Example 4 | 1.33 | 5.9 | A | A | A |
| Example 5 | 1.31 | 7.3 | A | A | B |
| Example 6 | 1.25 | 5.5 | A | A | A |
| Example 7 | 1.45 | 5.5 | A | A | A |
| Example 8 | 1.51 | 5.4 | B | A | A |
| Example 9 | 1.59 | 5.3 | A | A | A |
| Example 10 | 1.45 | 4.9 | B | A | A |
| Comparative Example 1 | 1.29 | 3.2 | C | A | A |
| Comparative Example 2 | 1.35 | 8.3 | A | A | C |
| Comparative Example 3 | 1.20 | 5.0 | C | A | A |
| Comparative Example 4 | 1.65 | 5.8 | C | B | A |
| Comparative Example 5 | 1.39 | 5.6 | B | C | A |
| Comparative Example 6 | — | — | B | C | A |

As shown in Tables 1A and 1B, Examples 1 to 10 satisfied three characteristics of the rub resistance, the bending properties, and the suppression of occurrence of a moire, as compared with Comparative Examples 1 to 5.

In Comparative Example 1, the average line width of the fine metal wires was less than 1 μm and the rub resistance was poor.

In Comparative Example 2, the average line width of the fine metal wires was more than 2.5 μm and the moire was evaluated to be poor.

In Comparative Example 3, the average line width of the fine metal wires/the average line width of the layers to be plated was less than 1.25 and the rub resistance was poor.

In Comparative Example 4, the average line width of the fine metal wires/the average line width of the layers to be plated was more than 1.6 and the rub resistance was poor.

In Comparative Example 5, the line width of the layer to be plated on a side closest to the transparent substrate was the same as the line width of the layer to be plated at a position of 9/10 of the average height of the layers to be plated, and the bending properties were poor.

Comparative Example 6 was configured to have no layer to be plated, and the bending properties were poor.

In Examples 1 to 10, Examples 2 to 4 in which the average line width of the fine metal wires was 1.5 to 2.0 μm, among Examples 1 to 5, were excellent in all the three characteristics of the rub resistance, the bending properties, and the suppression of occurrence of a moire.

In Examples 6 to 8, Examples 6 and 7 in which the average line width of the fine metal wire/the average line width of the layers to be plated was 1.25 to 1.45 were excellent in all the three characteristics of the rub resistance, the bending properties, and the suppression of occurrence of a moire.

In Examples 9 and 10, Example 9 in which the fine metal wire had a concave part was excellent in the rub resistance.

EXPLANATION OF REFERENCES

10: image display apparatus
11: touch panel
12: touch sensor
14: image display unit
14a: display surface
14b: back surface
14c: side surface
15: protective layer
19: flexible circuit board
20: detection unit
22: peripheral wiring part
23a: first peripheral wire
23b: second peripheral wire
24: transparent substrate
24a, 25a: surface
24b: back surface
25: undercoat layer
26a: first external connection terminal
26b: second external connection terminal
29A: first detection electrode layer
29B: second detection electrode layer
30: first detection electrode
31a: first dummy electrode
31b: second dummy electrode
32: second detection electrode
33: first electrode terminal
34: second electrode terminal
35: fine metal wire
36: opening portion
40, 41: layer to be plated
42, 43, 45: metal layer
42a, 43a, 45a: surface
45c: central part
46: concave part
48: blackened layer
50: composition layer for forming layer to be plated
51: protective film
52, 53, 54, 55: mask
52a: light transmitting unit
52b: gradation unit
52c: light shielding unit
Bf: bending region
$D_1$: one direction
$D_2$: direction
Dt: lamination direction
$E_1$: detection region
$E_2$: peripheral region
Lb: actinic ray
Wc: average line width
Wh: line width
Wm: average line width
Ws: line width
tc: average height
tm: average height

What is claimed is:

1. A touch sensor comprising:
a transparent substrate having a display region and a non-display region; and
a fine metal wire disposed in the display region,
wherein a mesh pattern is composed of fine metal wires, the fine metal wire includes a layer to be plated and a metal layer formed on the layer to be plated in this order from a transparent substrate side,
the layer to be plated includes an organic component as a main component,
the fine metal wire has an average line width of 1 to 2.5 μm,
a ratio of the average line width of the fine metal wires to an average line width of layers to be plated is 1.25 to 1.6,
the layer to be plated has a convex shape in a direction away from the transparent substrate in a cross sectional shape of a cross section of the fine metal wire in a direction orthogonal to one direction in which the fine metal wire extends, and
a line width of the layer to be plated on a side closest to the transparent substrate is more than a line width of the layer to be plated at a position of 9/10 of an average height of the layers to be plated facing the direction away from the transparent substrate side in the cross sectional shape.

2. The touch sensor according to claim 1,
wherein a ratio of the average line width of the fine metal wires to the average height of the layers to be plated is 2 to 10.

3. The touch sensor according to claim 1,
wherein the average line width of the fine metal wires is 1.5 to 2.0 μm.

4. The touch sensor according to claim 1,
wherein the ratio of the average line width of the fine metal wires to the average line width of the layers to be plated is 1.25 to 1.45.

5. The touch sensor according to claim 1,
wherein the fine metal wire has a concave part in a central part of a surface of the fine metal wire on a side opposite to the transparent substrate side in the cross sectional shape.

6. The touch sensor according to claim 1,
wherein the fine metal wire is provided with a blackened layer on a surface of the metal layer on an opposite side of the layer to be plated.

7. The touch sensor according to claim 1,
wherein an undercoat layer is provided between the transparent substrate and the layer to be plated.

8. The touch sensor according to claim 1,
wherein a protective layer is provided on the fine metal wire.

9. The touch sensor according to claim 2,
wherein the average line width of the fine metal wires is 1.5 to 2.0 μm.

10. The touch sensor according to claim 2,
wherein the ratio of the average line width of the fine metal wires to the average line width of the layers to be plated is 1.25 to 1.45.

11. The touch sensor according to claim 3,
wherein the ratio of the average line width of the fine metal wires to the average line width of the layers to be plated is 1.25 to 1.45.

12. The touch sensor according to claim 2,
wherein the fine metal wire has a concave part in a central part of a surface of the fine metal wire on a side opposite to the transparent substrate side in the cross sectional shape.

13. The touch sensor according to claim 3,
wherein the fine metal wire has a concave part in a central part of a surface of the fine metal wire on a side opposite to the transparent substrate side in the cross sectional shape.

14. The touch sensor according to claim 2,
wherein the fine metal wire is provided with a blackened layer on a surface of the metal layer on an opposite side of the layer to be plated.

15. The touch sensor according to claim 3,
wherein the fine metal wire is provided with a blackened layer on a surface of the metal layer on an opposite side of the layer to be plated.

16. The touch sensor according to claim 2,
wherein an undercoat layer is provided between the transparent substrate and the layer to be plated.

17. The touch sensor according to claim 3,
wherein an undercoat layer is provided between the transparent substrate and the layer to be plated.

18. The touch sensor according to claim 2,
wherein a protective layer is provided on the fine metal wire.

19. The touch sensor according to claim 3,
wherein a protective layer is provided on the fine metal wire.

20. The touch sensor according to claim 1,
wherein an outer shape of the layer to be plated is an arc shape in the cross section of the fine metal wire in the direction orthogonal to the one direction in which the fine metal wire extends.

* * * * *